(12) United States Patent
Kikuta et al.

(10) Patent No.: US 8,985,480 B2
(45) Date of Patent: Mar. 24, 2015

(54) WASHER APPARATUS FOR VEHICLE

(75) Inventors: Tomoyuki Kikuta, Toyohashi (JP); Yukihiro Matsushita, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 421 days.

(21) Appl. No.: 13/547,762

(22) Filed: Jul. 12, 2012

(65) Prior Publication Data

US 2013/0037627 A1     Feb. 14, 2013

(30) Foreign Application Priority Data

Aug. 9, 2011  (JP) ................................. 2011-174159
Oct. 4, 2011  (JP) ................................. 2011-220203
Oct. 11, 2011  (JP) ................................. 2011-224256

(51) Int. Cl.

| B05B 1/10 | (2006.01) |
|---|---|
| B60S 1/56 | (2006.01) |
| B05B 15/00 | (2006.01) |
| A01M 7/00 | (2006.01) |
| B60S 1/48 | (2006.01) |
| B60S 1/52 | (2006.01) |
| B60S 1/58 | (2006.01) |

(52) U.S. Cl.
CPC . B60S 1/56 (2013.01); B05B 15/00 (2013.01); A01M 7/0089 (2013.01); B60S 1/485 (2013.01); B60S 1/52 (2013.01); B60S 1/583 (2013.01)
USPC ............. 239/284.1; 239/69; 239/71; 239/289

(58) Field of Classification Search
USPC .................. 239/284.1, 284.2, 69, 71, 73, 289
See application file for complete search history.

(56) References Cited

U.S. PATENT DOCUMENTS

| 7,506,823 | B2* | 3/2009 | Eisele et al. ................ 239/284.1 |
| 2003/0222156 | A1* | 12/2003 | Bissonnette ................ 239/284.1 |
| 2009/0250533 | A1* | 10/2009 | Akiyama et al. ........... 239/284.1 |
| 2011/0266375 | A1 | 11/2011 | Ono et al. |

FOREIGN PATENT DOCUMENTS

| JP | A-11-255018 | 9/1999 |
| JP | A-2004-182080 | 7/2004 |
| JP | A-2007-053448 | 3/2007 |
| JP | A-2009-220719 | 10/2009 |

OTHER PUBLICATIONS

U.S. Appl. No. 13/399,326, filed Feb. 17, 2012, Kikuta et al.

* cited by examiner

*Primary Examiner* — Steven J Ganey
(74) *Attorney, Agent, or Firm* — Posz Law Group, PLC

(57) ABSTRACT

A controller may drive a solenoid switch valve to switch the same between a first connecting state and a second connecting state in a state where an electric pump is stopped. In the first connecting state, the switch valve connects the pump to a rear washer nozzle. In the second connecting state, the switch valve connects the pump to a camera washer nozzle. The controller may also display a captured image of an onboard camera and a camera wash touch panel switch on a display when the controller receives a reverse mode signal. The controller may drive the pump to feed the washer fluid to the camera washer nozzle when the controller receives a command signal from the camera wash touch panel switch.

17 Claims, 10 Drawing Sheets

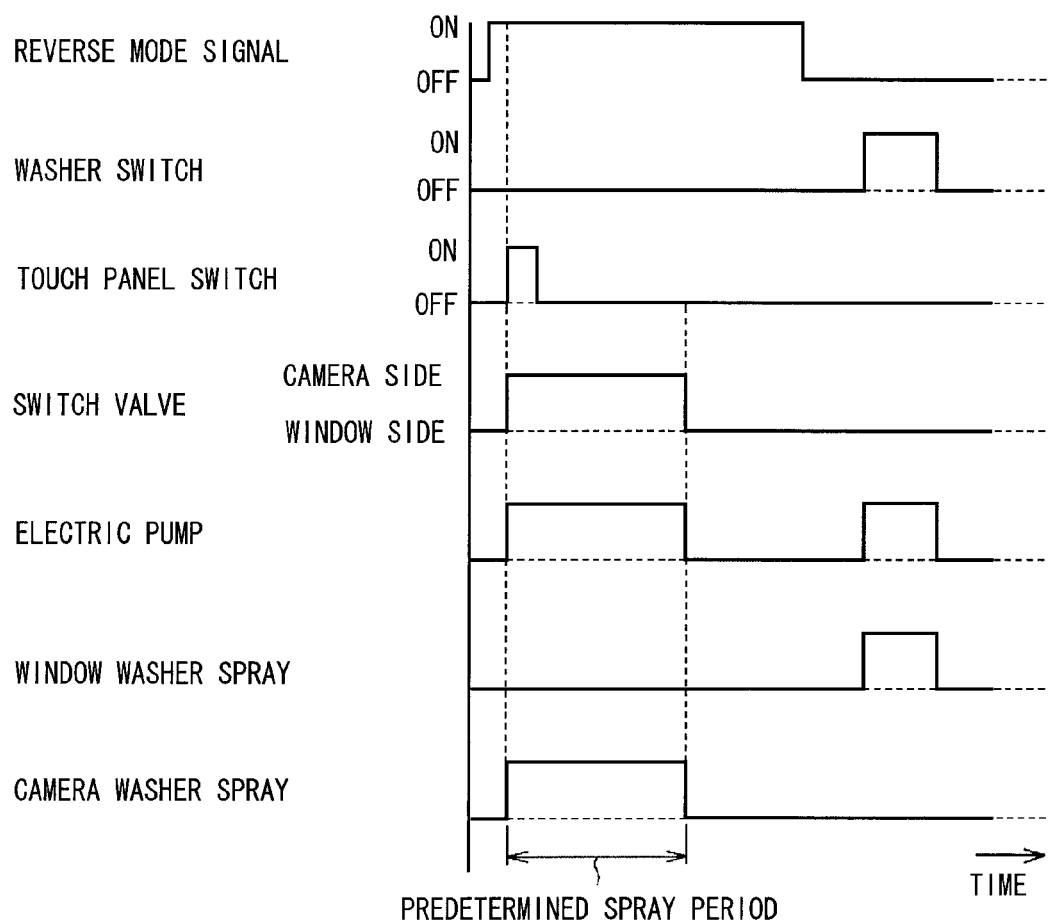

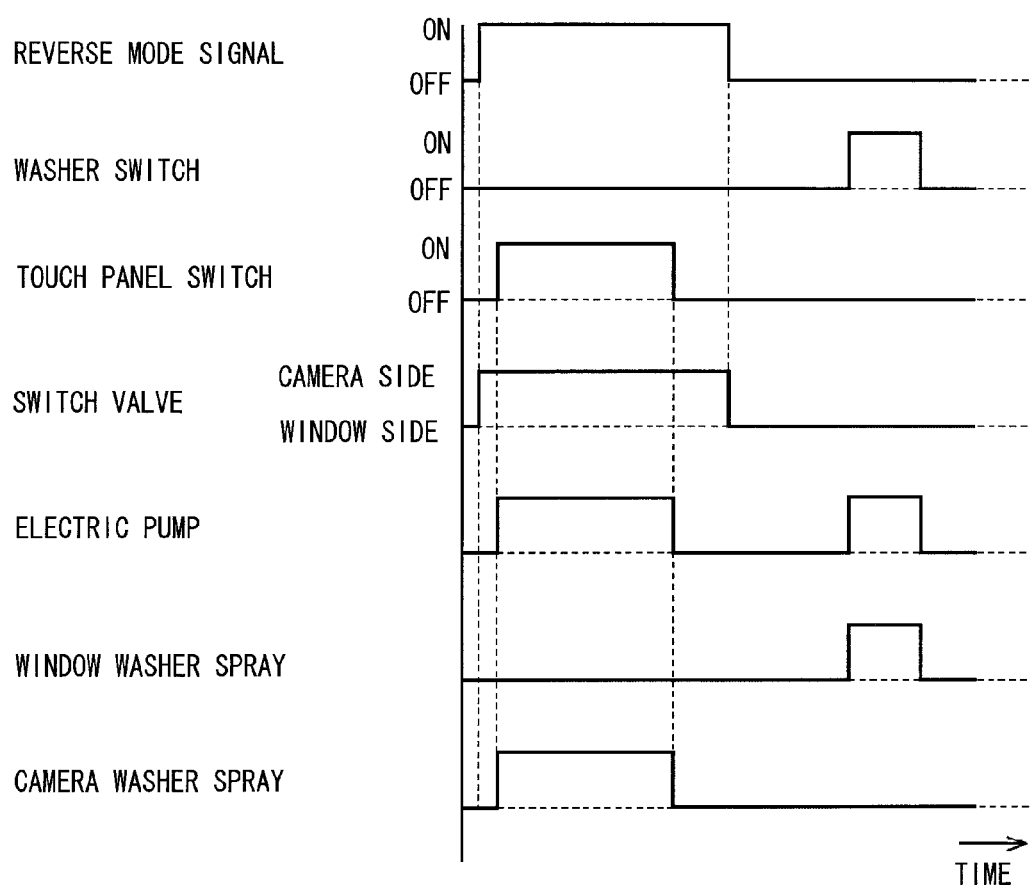

WASHER APPARATUS FOR VEHICLE

CROSS REFERENCE TO RELATED APPLICATION

This application is based on and incorporates herein by reference Japanese Patent Application No. 2011-174159 filed on Aug. 9, 2011, Japanese Patent Application No. 2011-220203 filed on Oct. 4, 2011 and Japanese Patent Application No. 2011-224256 filed on Oct. 11, 2011.

TECHNICAL FIELD

The present disclosure relates to a washer apparatus for a vehicle.

BACKGROUND

At the time of driving a vehicle backward, it is known to capture an image of a rear side state of the vehicle through an onboard camera and to display the captured image on a monitor device of a vehicle navigation system. Since the onboard camera is placed at the outside of the vehicle, for instance, dirt will likely adhere to a lens of the onboard camera. When the dirt adheres to the lens of the onboard camera, it is difficult to capture and see a clear image of the rear side state of the vehicle through the onboard camera.

In order to address the above disadvantage, for instance, JPH11-255018A teaches a washer apparatus that includes a nozzle and a pump. The nozzle sprays washer fluid over the lens of the onboard camera to wash the deposit adhered thereto, and the pump feeds the washer fluid to the nozzle. In this washer apparatus, an electric motor is energized synchronously with a back alarm and a back lamp by supplying an electric current from an electric power source circuit of the back alarm or the back lamp to the electric motor at the time of driving the vehicle backward. In this way, the onboard camera is automatically washed at the time of driving the vehicle backward without requiring manipulation of a switch by a driver of the vehicle for executing the washing operation.

The above washer apparatus includes the dedicated washer fluid tank and the dedicated pump, which are dedicated for the washing of the onboard camera. It may be easy to have a sufficient accommodation space for accommodating the components of the above washer apparatus in a case of large vehicles, such as a bus or truck. However, it is often difficult to have a sufficient accommodation space for the components of the above washer apparatus in a case of a compact passenger vehicle.

Furthermore, the dedicated washer fluid tank and the dedicated pump may result in an increase in the costs of the washer apparatus.

In the above washer apparatus, the electric motor can be energized through manipulation of a mechanical camera wash dedicated switch. In this way, the driver can wash the onboard camera while staying in the driver's seat through use of such a switch. However, the provision of the mechanical camera wash dedicated switch may cause the following disadvantage. Specifically, signal lines, which include signal lines associated with the camera wash dedicated switch, are complicated, thereby resulting in the increased costs. Furthermore, the mechanical camera wash dedicated switch may possibly result in confusion of the driver (user) with respect to the use of the camera wash dedicated switch (e.g., confusion with respect to the location of the camera wash dedicated switch, confusion with respect to operation of the camera wash dedicated switch) and/or may result in annoyance of the driver (user).

The mechanical camera wash dedicated switch of the washer apparatus may be added to a lever, in which other washer system switches (e.g., a wiper switch) are integrally provided. However, in such a case, at the time of manipulating the camera wash dedicated switch, the driver may possibly perform an erroneous manipulation of the switch or may experience confusion (e.g., confusion with respect to the identification of the camera wash dedicated switch, confusion with respect to operation of the camera wash dedicated switch). It is conceivable to place the camera wash dedicated switch to another location, such as a steering wheel, which is other than the lever where the washer system switches (e.g., the wiper switch) are integrally provided. However, even in such a case, the disadvantages, which are similar to those discussed above, may possibly occur. Furthermore, when the mechanical camera wash dedicated switch is provided, the costs of the washer apparatus for the vehicle may possibly be increased.

SUMMARY

The present disclosure addresses at least one of the above disadvantages.

According to the present disclosure, there is provided a washer apparatus for a vehicle, including a tank, a camera washer nozzle, at least one window glass washer nozzle, an electric pump, a main conduit, a branch conduit, a switching device, a washer switch and a controller. The tank is adapted to store washer fluid. The camera washer nozzle is adapted to receive the washer fluid from the tank and to spray the washer fluid over one side of an onboard camera of the vehicle where a lens of the onboard camera is located. The at least one window glass washer nozzle is adapted to receive the washer fluid from the tank and to spray the washer fluid over at least one of a front window glass and a rear window glass of the vehicle. The electric pump is adapted to pump the washer fluid from the tank and thereby to supply the washer fluid toward the camera washer nozzle and the at least one window glass washer nozzle. The main conduit is adapted to connect between the electric pump and the at least one window glass washer nozzle to feed the washer fluid to the at least one window glass washer nozzle. The branch conduit is branched from the main conduit at a branch point and is adapted to connect between an upstream side portion of the main conduit, which is located on an upstream side of the branch conduit, and the camera washer nozzle to feed the washer fluid to the camera washer nozzle. The switching device is provided at the branch point between the upstream side portion of the main conduit and the branch conduit and is adapted to switch between a first connecting state, in which the switching device connects the upstream side portion of the main conduit to the at least one window glass washer nozzle, and a second connecting state, in which the switching device connects the upstream side portion of the main conduit to the camera washer nozzle. The washer switch is adapted to be manipulated by an occupant of the vehicle. The controller is adapted to drive the electric pump in response to input of a command signal from the washer switch to the controller. The controller is adapted to drive the switching device to switch the switching device between the first connecting state and the second connecting state in a state where the electric pump is stopped.

According to the present disclosure, there is also provided a washer apparatus for a vehicle, including a tank, a camera washer nozzle, an electric pump, a display and a controller. The tank is adapted to store washer fluid. The camera washer nozzle is adapted to receive the washer fluid from the tank and to spray the washer fluid over one side of an onboard camera of the vehicle where a lens of the onboard camera is located. The electric pump is adapted to pump the washer fluid from the tank and thereby to supply the washer fluid toward the camera washer nozzle. The display is adapted to display a captured image of the onboard camera. The controller is adapted to display the captured image of the onboard camera and a camera wash touch panel switch on the display in response to input of a reverse mode signal, which indicates a reverse drive mode of the vehicle, to the controller. The controller is adapted to drive the electric pump to feed the washer fluid to the camera washer nozzle in response to input of a command signal from the camera wash touch panel switch to the controller upon turning on of the camera wash touch panel switch by an occupant of the vehicle.

BRIEF DESCRIPTION OF THE DRAWINGS

The drawings described herein are for illustration purposes only and are not intended to limit the scope of the present disclosure in any way.

FIG. 10 is a diagram showing a timing chart for various signals and operations in the washer apparatus of the fourth embodiment;

FIG. 12 is a diagram showing a timing chart for various signals and operations in another modification of the washer apparatus of the embodiment.

DETAILED DESCRIPTION

First Embodiment

A washer apparatus of a first embodiment of the present disclosure will be described with reference to FIGS. 1 to 4.

Figure 1:
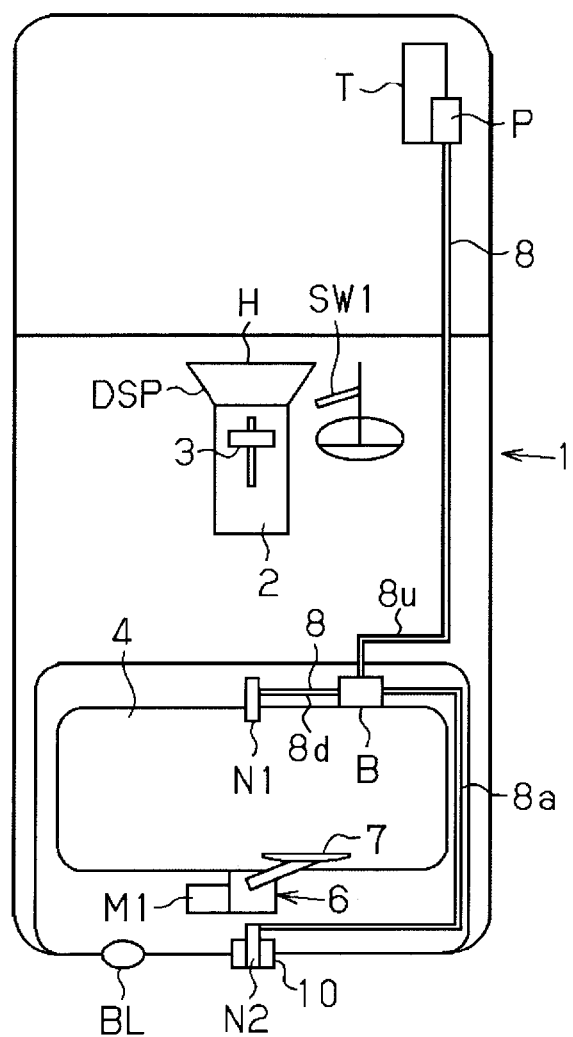
FIG. 1 is a schematic diagram of a vehicle having a washer apparatus according to a first embodiment of the present disclosure.

As shown in FIG. 1, a shift lever 3 of a transmission 2 is placed on a lateral side of a driver's seat in a vehicle 1. When the shift lever 3 is manipulated by a driver (also referred to as an occupant or a user) of the vehicle, a gear ratio of the transmission 2 is changed to change a speed of the vehicle 1. For instance, when the shift lever 3 is placed in a first speed position, the gear ratio of the transmission 2 is sifted to a first speed gear ratio. When the shift lever 3 is placed in a second speed position, the gear ratio of the transmission 2 is sifted to a second speed gear ratio. Furthermore, when the shift lever 3 is placed in a neutral position, the transmission 2 is sifted into a neutral state, disconnecting the transmission 2 from the driven road wheels.

When the shift lever 3 is placed in a reverse position, the vehicle 1 is enabled to move backward (placing the vehicle 1 into a backwardly movable state, i.e., a reverse drive mode or simply referred to as a reverse mode). At this time, a back lamp BL, which is provided at a rear side of the vehicle 1, is turned on, i.e., is lit as long as the shift lever 3 is placed in the reverse position.

A display device H is placed at a console panel of the vehicle 1 to display a current location of the vehicle 1 on a display (screen) DSP of the display device H along with a map provided by a navigation system of the vehicle 1.

A rear wiper device 6 is placed in a rear center position of the vehicle 1 at a lower side of a rear window glass 4. In the rear wiper device 6, when a rear wiper motor M1 is driven to rotate, a wiping movement (swing movement) of a rear wiper (also referred to as a wiper blade) 7 along an external surface of the rear window glass 4 is executed to wipe the external surface of the rear window glass 4.

A rear washer nozzle (serving as a rear window glass washer nozzle or simply referred to as a window glass washer nozzle) N1 is placed in the rear center position of the vehicle 1 at an upper side of the rear window glass 4. A nozzle opening of the rear washer nozzle N1 is directed to the rear window glass 4 located on a lower side of the nozzle opening of the rear washer nozzle N1 to spray washer fluid over a wiping surface of the rear window glass 4 from the nozzle opening of the rear washer nozzle N1.

The rear washer nozzle N1 is connected to a washer pump P located in a front engine room of the vehicle 1 through a main conduit 8 (forming a flow passage of the washer fluid). The washer pump P is a pump that feeds the washer fluid from a tank T, which is placed in the engine room and stores the washer fluid, to the rear washer nozzle N1 through the main conduit 8. When a washer switch SW1, which is provided at the driver's seat side, is manipulated to an ON position by the driver, a pump motor M2 (see FIG. 2) of the washer pump P is driven to feed the washer fluid from the tank T to the rear washer nozzle N1 through the main conduit 8.

A back monitor onboard camera 10 is placed at a rear outer side of the vehicle at a location, which is on a rear side of the rear wiper device 6. In the present embodiment, the onboard camera 10 is a rear view camera for monitoring a rear side (back side) of the vehicle 1. An image, which is captured by the onboard camera 10, is outputted as the image data to the display device H placed at the console panel of the vehicle 1. The display device H displays the image, which is captured by the onboard camera 10, on the display (screen) DSP of the display device H based on the image data of the captured image.

When the shift lever 3 of the transmission 2 is placed into the reverse position to place the vehicle in the reverse drive mode, the onboard camera 10 begins to capture the image and outputs the image data of the captured image to the display device H. Then, when the shift lever 3 is shifted from the reverse position to another position, which is other than the reverse position, the onboard camera 10 terminates the capturing of the image.

A camera washer nozzle N2 is provided at a location, which is adjacent to the onboard camera 10 and is outside of a rear image capturing view angle of the onboard camera 10. A nozzle opening of the camera washer nozzle N2 is directed to one side of the onboard camera 10 where a lens 10b (see FIG. 2) of the onboard camera 10 is located. More specifically, the nozzle opening of the camera washer nozzle N2 is directed to a glass cover 10a (see FIG. 2), which is also referred to as a transparent protective cover and is provided at the one side of the onboard camera 10 in front of the lens 10b to protect the lens 10b of the onboard camera 10 from, for example, dirt, debris and/or dust. The washer fluid is sprayed from the nozzle opening of the camera washer nozzle N2 over the glass cover 10a of the onboard camera 10.

The camera washer nozzle N2 is connected to a branch conduit 8a, which is branched from the main conduit 8 that connects between the washer pump P and the rear washer nozzle N1. More specifically, the branch conduit 8a is branched from the main conduit 8 at a branch point located in the rear side of the vehicle and is adapted to connect between an upstream side portion 8u of the main conduit 8, which is located on an upstream side of the branch conduit 8a in the flow direction of the washer fluid, and the camera washer nozzle N2 to feed the washer fluid to the camera washer nozzle N2. A solenoid switch valve B (serving as s switching means or a switching device) is provided at the branch point, at which the branch conduit 8a is branched from the main conduit 8. The solenoid switch valve B is a valve that feeds the washer fluid received from the washer pump P to a corresponding one of the camera washer nozzle N2 and the rear washer nozzle N1. The solenoid switch valve B is adapted to switch between a first connecting state and a second connecting state. In the first connecting state, the solenoid switch valve B connects the upstream side portion 8u of the main conduit 8 to the rear washer nozzle N1 to feed the washer fluid to the rear washer nozzle N1 through a downstream side portion 8d of the main conduit 8, which is located on a downstream side of the solenoid switch valve B in the flow direction of the washer fluid. In the second connecting state, the solenoid switch valve B connects the upstream side portion 8u of the main conduit 8 to the camera washer nozzle N2 through the downstream side portion 8d of the main conduit 8.

When the washer switch SW1 is manipulated by the driver upon placement of the shift lever 3 into the reverse position, the solenoid switch valve B is driven into the second connecting state to connect between the branch conduit 8a and the upstream side portion 8u of the main conduit 8. Specifically, the solenoid switch valve B disconnects between the rear washer nozzle N1 and the washer pump P and connects between the camera washer nozzle N2 and the washer pump P. Thus, the camera washer nozzle N2 is placed into a feedable state, in which the washer fluid can be fed from the tank T to the camera washer nozzle N2 through the washer pump P. In this way, the washer pump P is driven to feed the washer fluid from the tank T to the camera washer nozzle N2 through the upstream side portion 8u of the main conduit 8 and the branch conduit 8a. Thus, the washer fluid is sprayed from the nozzle opening of the camera washer nozzle N2 over the glass cover 10a of the onboard camera 10.

In contrast, when the shift lever 3 of the transmission 2 is positioned into the other position, which is other than the reverse position, the solenoid switch valve B is placed into the first connecting state. In the first connecting state of the solenoid switch valve B, the connection between the branch conduit 8a and the upstream side portion 8u of the main conduit 8 is disconnected. That is, the solenoid switch valve B connects between the rear washer nozzle N1 and the washer pump P through the main conduit 8 (the upstream side portion 8u and the downstream side portion 8d). Thus, normally, the rear washer nozzle N1 is placed into a feedable state, in which the washer fluid can be fed from the tank T to the rear washer nozzle N1 through the washer pump P.

In this feedable state, when the washer switch SW1, which is provided at the driver's seat side, is manipulated to the ON position by the driver, the washer pump P is driven to feed the washer fluid from the tank T to the rear washer nozzle N1 through the main conduit 8. Thus, the washer fluid is sprayed from the nozzle opening of the rear washer nozzle N1 over the rear window glass 4.

Next, an electrical structure of the washer apparatus, which is constructed in the above described manner, will be described with reference to FIG. 2.

Figure 2:
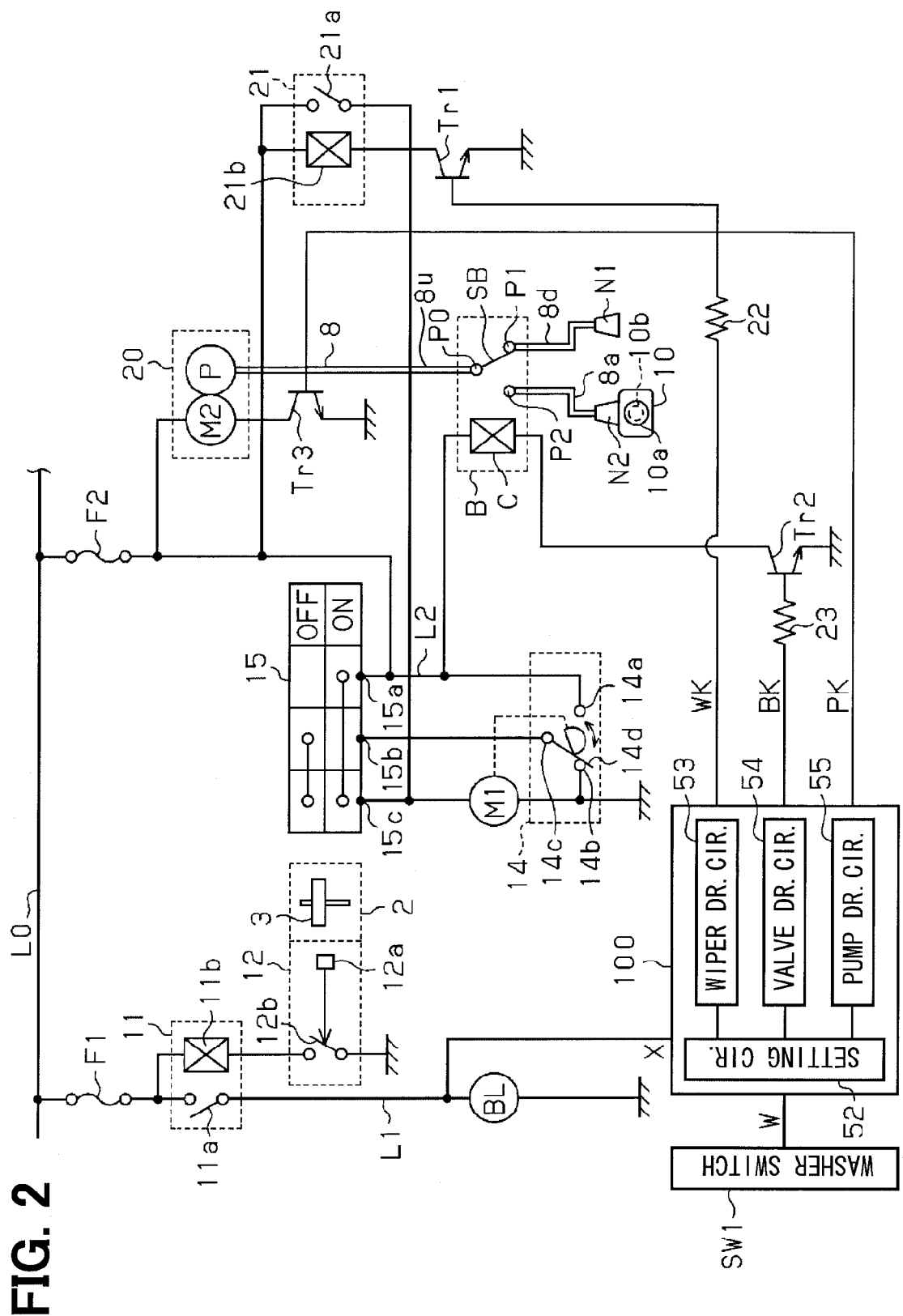
FIG. 2 is a circuit diagram showing an electrical structure of the washer apparatus of the first embodiment.

In FIG. 2, one end of the back lamp BL, which is provided at the rear side of the vehicle 1, is connected to a ground, and the other end of the back lamp BL is connected in series to a back lamp relay 11, which is provided in the engine room at the front side of the vehicle 1, through a lamp harness L1.

(Back Lamp Relay 11)

The back lamp relay 11 is a reed relay, which includes a reed switch 11a and a magnetizing coil (also referred to as an exciting coil) 11b. A plus (+) terminal of the reed switch 11a is connected to a plus (+) power supply line L0 through a fuse F1, and a minus (−) terminal of the reed switch 11a is connected to the back lamp BL through the lamp harness L1. When the magnetizing coil 11b is magnetized upon energization thereof, the reed switch 11a is turned on, i.e., is closed to supply the electric current to the back lamp BL, and thereby the back lamp BL is turned on, i.e., is lit. Furthermore, a controller (also referred to as a wash control circuit) 100 is connected to the lamp harness L1. A signal (a reverse mode signal X), which indicates that the vehicle is in the reverse drive mode, is inputted to the controller 100 simultaneously with the turning on of the back lamp BL.

One end of the magnetizing coil 11b of the back lamp relay 11 is connected to the plus terminal of the reed switch 11a, and the other end of the magnetizing coil 11b is connected to a position sensor 12. The position sensor 12 serves as a reverse drive mode sensor for sensing the reverse drive mode of the vehicle.

(Position Sensor 12)

The position sensor 12 is a sensor that senses the reverse position of the shift lever 3 of the transmission 2. The position sensor 12 includes a sensing device 12a and an open/close switch 12b. The sensing device 12a is a sensing element placed at a location that is adjacent to the reverse position of the shift lever 3. The open/close switch 12b is a switching transistor, which is turned on or off in response to a detection signal received from the sensing device 12a.

When the shift lever 3 is positioned in the reverse position, the sensing device 12a outputs the detection signal, which turns on the open/close switch 12b (thereby resulting in a closed circuit connection of the open/close switch 12b). In contrast, when the shift lever 3 is positioned in the other position, which is other than the reverse position, the sensing device 12a stops the outputting of the detection signal, and thereby the open/close switch 12b is turned off (thereby resulting in an opened circuit connection of the open/close switch 12b).

One end of the open/close switch 12b is connected to the magnetizing coil 11b of the back lamp relay 11, and the other end of the open/close switch 12b is connected to the ground.

When the sensing device 12a senses the placement of the shift lever 3 into the reverse position, the open/close switch 12b is turned on to supply the electric current to the magnetizing coil 11b. That is, the open/close switch 12b turns on the reed switch 11a to supply the electric current to the back lamp BL through the lamp harness L1 thereby resulting in the turning on (lighting) of the back lamp BL and to output the signal (reverse mode signal X), which indicates that the vehicle is in the reverse drive mode.

In contrast, when the sensing device 12a senses the placement of the shift lever 3 into the other position, which is other than the reverse position, the open/close switch 12b is turned off to stop the supply of the electric current to the magnetizing coil 11b. That is, the open/close switch 12b turns off the reed switch 11a to stop the supply the electric current to the lamp harness L1 thereby placing the back lamp BL into the off-state.

(Controller 100)

The controller 100 is connected with the washer switch SW1. When the washer switch SW1 is manipulated by the driver to turn on the same, a command signal (washer signal W) is supplied from the washer switch SW1 to the controller 100. The controller 100 generates various signals based on the signal (the reverse mode signal X), which indicates that the vehicle is in the reverse drive mode, and the command signal (the washer signal W). Specifically, the controller 100 includes a reference time setting circuit 52, a wiper drive circuit 53, a valve drive circuit 54 and a pump drive circuit 55. The reference time setting circuit 52 measures predetermined time periods t1-t4 (see FIG. 4). The wiper drive circuit 53 drives the rear wiper motor M1. The valve drive circuit 54 drives the solenoid switch valve B. The pump drive circuit 55 drives the pump motor M2 (the washer pump P). Each of the wiper drive circuit 53, the valve drive circuit 54 and the pump drive circuit 55 outputs a corresponding drive signal of a high level (a wiper drive signal WK, a valve drive signal BK, a pump drive signal PK) to a base terminal of a corresponding one of NPN transistors Tr1-Tr3, which will be described later, based on the reverse mode signal X, the washer signal W and the signal from the reference time setting circuit 52. The transistors Tr1-Tr3 are switching elements, which drive the rear wiper motor M1, the solenoid switch valve B and the pump motor M2 (the washer pump P), respectively. Electrical connections of the transistors Tr1-Tr3 will be described later.

(Rear Wiper Motor M1)

On end of the rear wiper motor M1, which drives the rear wiper device 6, is connected to a rear wiper switch 15. A first terminal (also referred to as a +B terminal) of the rear wiper switch 15 is connected to the plus power supply line L0 through a fuse F2, which is placed in the engine room at the front side of the vehicle 1. The other end of the rear wiper motor M1 is connected to the ground.

A cam-operated switch 14 is installed to the rear wiper motor M1. The cam-operated switch 14 forms an automatic stop position controller of the rear wiper device 6, which drives the rear wiper motor M1 to move the wiper 7 all the way back to a home position thereof even when the wiper 7 is located in a location, which is other than the home position, upon turning off of the rear wiper switch 15.

(Cam-Operated Switch 14)

The cam-operated switch 14 includes a first contact (also referred to as an a-contact) 14a, a second contact (also referred to as a b-contact) 14b, a common contact 14c and a movable contact 14d. The first contact 14a is connected to the plus power supply line L0 through the fuse F2. The second contact 14b is connected to the other end of the rear wiper motor M1 and is connected to the ground along with the other end of the rear wiper motor M1. One end of the movable contact 14d is connected to the common contact 14c, which is connected to a second terminal (also referred to as an S terminal) 15b of the rear wiper switch 15. The movable contact 14d is moved in response to the rotation of the rear wiper motor M1. The movable contact 14d is movable, so that the other end of the movable contact 14d is connectable to one of the first contact 14a and the second contact 14b.

Specifically, when the wiper 7 is in the other position, which is other than the home position, the movable contact 14d is connected to the first contact 14a. Therefore, even when the rear wiper switch 15 is held in the OFF position, the supply of the electric power from the plus power source line L0 to the rear wiper motor M1 is maintained through the cam-operated switch 14.

Then, when the wiper 7 is placed in the home position, the movable contact 14d is moved away from the first contact 14a and is then connected to the second contact 14b. In this way, the one end and the other end of the rear wiper motor M1 form a closed circuit and are both connected to the ground, so that a dynamic braking is applied to stop the rotation of the rear wiper motor M1.

(Rear Wiper Switch 15)

The rear wiper switch 15 is a switch that is provided to drive the rear wiper motor M1. The rear wiper switch 15 is turned on or off by the driver. The rear wiper switch 15 includes the first terminal (+B terminal) 15a, the second terminal (S terminal) 15b and a third terminal (also referred to as a +1 terminal) 15c.

The third terminal (+1 terminal) 15c is connected to the one end (positive terminal side) of the rear wiper motor M1. The second terminal (S terminal) 15b is connected to the common contact 14c of the cam-operated switch 14. The first terminal (+B terminal) 15a is connected to the plus power supply line L0 through the fuse F2 and is also connected to the first contact (the a-contact) 14a of the cam-operated switch 14.

At the time of driving the rear wiper motor M1 (at the time of driving the rear wiper device 6), the rear wiper switch 15 is manipulated by the driver from the OFF position to the ON position. That is, the electric current is supplied from the power source line L0 through the first terminal (+B terminal) 15a of the rear wiper switch 15, the third terminal (+1 terminal) 15c of the rear wiper switch 15 and the rear wiper motor M1 in this order regardless of the state of the cam-operated switch 14, so that the rear wiper motor M1 is driven to rotate.

At the time of stopping the rear wiper motor M1 (at the time of stopping the rear wiper device 6), the rear wiper switch 15 is manipulated by the driver from the ON position to the OFF position. Then, the supply of the electric current to the rear wiper motor M1 is controlled by the cam-operated switch 14. That is, as discussed above, when the wiper 7 is placed in the other position, which is other than the home position, the supply of the electric current from the plus power supply line L0 is maintained through the cam-operated switch 14 to drive the rear wiper motor M1. Then, when the wiper 7 is placed in the home position, the supply of the electric current from the plus power supply line L0 is stopped through the cam-operated switch 14 to stop the rear wiper motor M1.

A wiper drive relay 21 is connected to the one end (positive terminal side) of the rear wiper motor M1. The wiper drive relay 21 includes a switch 21a and a magnetizing coil 21b. One end of the switch 21a is connected to the plus power supply line L0 through the fuse F2, and the other end of the switch 21a is connected to the one end (the positive terminal side) of the rear wiper motor M1. One end of the magnetizing coil 21b is connected to the plus power supply line L0 through the fuse F2, and the other end of the magnetizing coil 21b is connected to the ground through the transistor Tr1. Specifically, the wiper drive relay 21 is constructed such that when the transistor Tr1 is turned on, the magnetizing coil 21b is energized to turn on the switch 21a. The controller 100 (more specifically, the wiper drive circuit 53) is connected to the base terminal of the transistor Tr1 through a resistor 22. Thereby, when the wiper drive signal WK is inputted from the controller 100 (more specifically, the wiper drive circuit 53) to the base terminal of the transistor Tr1, the switch 21a is turned on, i.e., is closed. Thereby, the electric power is supplied to the rear wiper motor M1 through the switch 21a regardless of the operational state of the rear wiper switch 15.

(Pump Motor M2)

One end of the pump motor M2, which drives the washer pump P, is connected to the power supply line L0 through the fuse F2, and the other end of the pump motor M2 is connected to the ground through the transistor Tr3. The controller 100 (more specifically, the pump drive circuit 55) is connected to the base terminal of the transistor Tr3. Therefore, when the pump drive signal PK is inputted from the controller 100 (more specifically, the pump drive circuit 55) to the base terminal of the transistor Tr3, the electric power is supplied from the power supply line L0 to the pump motor M2. Thereby, the washer pump P is driven. In this way, the washer fluid is fed from the tank T to the main conduit 8.

That is, the pump motor M2 and the washer pump P form an electric pump 20. The electric pump 20 feeds the washer fluid from the tank T to the main conduit 8 based on the pump drive signal PK received from the controller 100 (more specifically, the pump drive circuit 55).

(Solenoid Switch Valve B)

The solenoid switch valve B includes an intake port P0, through which the washer fluid is supplied from the upstream side portion 8u of the main conduit 8 located on the upstream side of the solenoid switch valve B in the flow direction of the washer fluid. The solenoid switch valve B further includes a first discharge port P1 and a second discharge port P2. The first discharge port P1 discharges the washer fluid to the downstream side portion 8d of the main conduit 8, which is located on the downstream side of the solenoid switch valve B in the flow direction of the washer fluid and is connected to the rear washer nozzle N1. The second discharge port P2 discharges the washer fluid to the branch conduit 8a, which is located on the downstream side of the solenoid switch valve B and is connected to the camera washer nozzle N2.

When a spool valve SB, which is provided in a valve main body in the solenoid switch valve B, is driven, the intake port P0 is connected to one of the first discharge port P1 and the second discharge port P2 while disconnecting the intake port P0 from the other one of the first discharge port P1 and the second discharge port P2.

The spool valve SB is controlled by the magnetizing coil C, which is provided in the solenoid switch valve B.

In the deenergized state (an initial state) of the magnetizing coil C, the spool valve SB is held such that the spool valve SB connects between the intake port P0 and the first discharge port P1 and disconnects between the intake port P0 and the second discharge port P2. In contrast, in the energized state of the magnetizing coil C, the spool valve SB is driven and is held such that the spool valve SB connects between the intake port P0 and the second discharge port P2 and disconnects between the intake port P0 and the first discharge port P1.

One end of the magnetizing coil C of the solenoid switch valve B is connected to the connection of the motor harness L2, which is connected to the cam-operated switch 14 of the rear wiper motor M1 at the rear side of the vehicle 1. The other end of the magnetizing coil C of the solenoid switch valve B is connected to the ground through the transistor Tr2. The controller 100 (more specifically, the valve drive circuit 54) is connected to the base terminal of the transistor Tr2 through a resistor 23. Therefore, when the valve drive signal BK is inputted from the controller 100 (more specifically, the valve drive circuit 54) to the base terminal of the transistor Tr2, the magnetizing coil C is energized.

Thereby, when the magnetizing coil C of the solenoid switch valve B is energized, the spool valve SB is driven and connects between the intake port P0 and the second discharge port P2. At this time, a portion of the electric power directed to the rear wiper motor M1 is supplied to the magnetizing coil C of the solenoid switch valve B to energize the same (the magnetizing coil C being connected to the power supply line, which provides the electric power to the rear wiper motor M1, to obtain the drive electric power).

Figure 3:
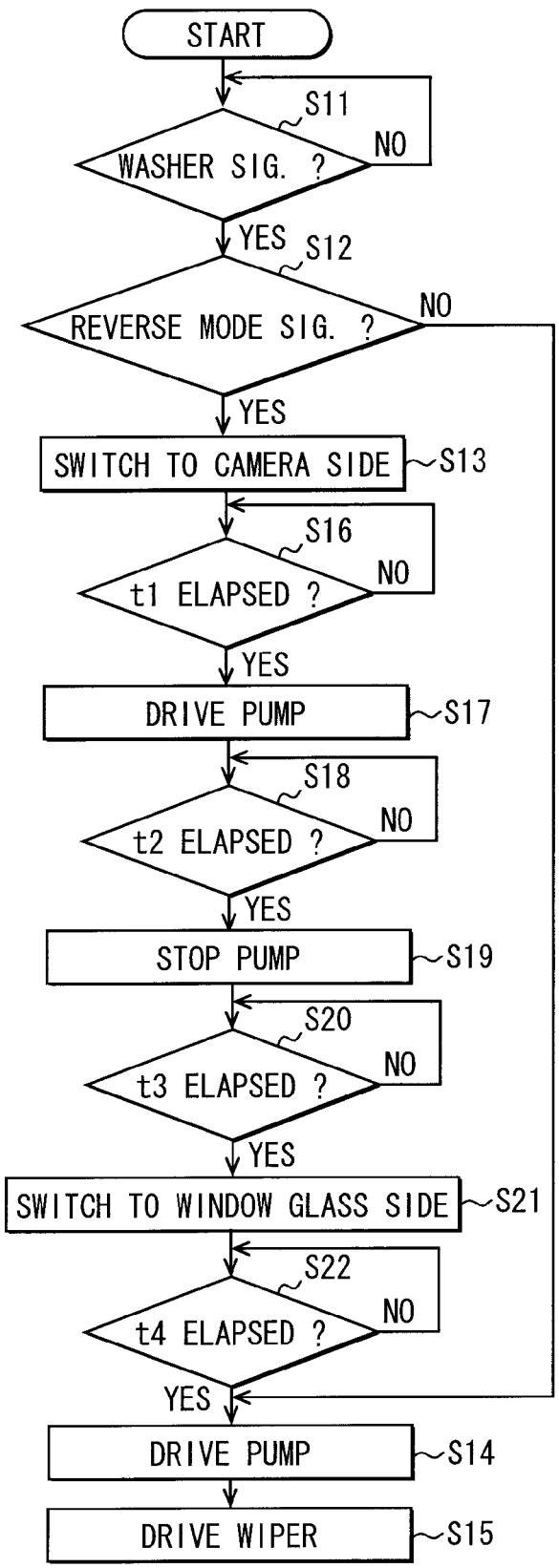
FIG. 3 is a diagram showing a flowchart of an operation executed by a controller of the first embodiment.

Now, the operation (process) of the controller 100 will be described together with its effect with reference to FIG. 3. At step S11, it is determined whether the command signal (the washer signal W), which is outputted from the washer switch SW1 at the time of turning on of the washer switch SW1, is inputted to the controller 100. When it is determined that the washer signal W is inputted to the controller 100 at step S11 (i.e., YES at step S11), the operation proceeds to step S12. In contrast, when it is determined that the washer signal W is not inputted to the controller 100 at step S11 (i.e., NO at step S11), the operation repeats step S11 once again.

At step S12, it is determined whether the signal (the reverse mode signal X), which indicates that the vehicle is in the reverse drive mode, is inputted to the controller 100. When it is determined that the reverse mode signal X is inputted to the controller 100 at step S12 (i.e., YES at step S12), the operation proceeds to step S13. In contrast, when it is determined that the reverse mode signal X is not inputted to the controller 100 at step S12 (i.e., NO at step S12), the operation proceeds to step S14. At step S14, the controller 100 outputs the pump drive signal PK to drive the pump motor M2 (and thereby the electric pump 20) and proceeds to step S15. At step S15, the controller 100 outputs the wiper drive signal WK to drive the rear wiper motor M1. Thereby, the electric pump 20 is driven, and the washer fluid is sprayed from the rear washer nozzle N1 over the rear window glass 4. Also, the rear wiper motor M1 is driven, so that the wiper 7 is driven to wipe the rear window glass 4.

In contrast, at step S13, the controller 100 outputs the valve drive signal BK to drive the solenoid switch valve B (to switch the flow passage of the washer fluid, which is pumped from the electric pump 20, to the camera washer nozzle N2 side). Then, at step S16, it is determined whether a predetermined pre-drive period (also referred to as a predetermined first time period) t1 shown in FIG. 4 has elapsed since the start of the outputting of the valve drive signal BK (i.e., since an initial time point of receiving the washer signal W in the presence of the input of the reverse mode signal X to the controller 100). When it is determined that the predetermined pre-drive period t1 has elapsed since the start of the outputting of the valve drive signal BK at step S16 (i.e., YES at step S16), the operation proceeds to step S17.

At step S17, the controller 100 outputs the pump drive signal PK. Then, at step S18, it is determined whether a predetermined drive period (also referred to as a predetermined second time period) t2 shown in FIG. 4 has elapsed since the start of the outputting of the pump drive signal PK. When it is determined that the predetermined drive period t2 (see FIG. 4) has elapsed since the start of the outputting of the pump drive signal PK at step S18 (i.e., YES at step S18), the operation proceeds to step S19. At step S19, the outputting of the pump drive signal PK is stopped. Therefore, the electric pump 20 is driven only for the predetermined drive period t2 to spray the washer fluid from the camera washer nozzle N2 over the glass cover 10a of the onboard camera 10.

Figure 4:
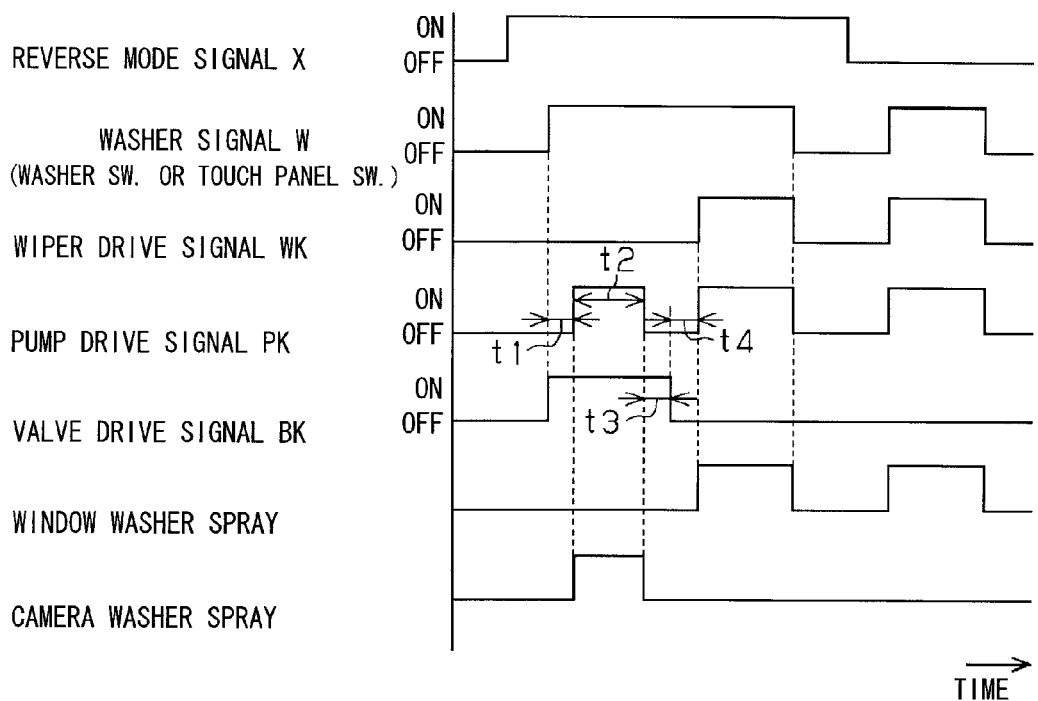
FIG. 4 is a diagram showing a timing chart for various signals and operations in the washer apparatus of the first embodiment.

Specifically, as shown in FIG. 4, when the washer signal W is inputted to the controller 100 in the presence of the input of the reverse mode signal X to the controller 100 (i.e., in the state where the reverse mode signal X is inputted to the controller 100), the controller 100 outputs the valve drive signal BK to switch the solenoid switch valve B to the camera washer nozzle N2 side within a predetermined pre-drive period (also referred to as a first predetermined time period) t1. Then, when the predetermined pre-drive period t1 has elapsed, the controller 100 outputs the pump drive signal PK and drives the electric pump 20 only for the predetermined drive period t2. Therefore, the washer fluid is sprayed from the camera washer nozzle N2 over the glass cover 10a of the onboard camera 10 only for the predetermined drive period t2 (see "CAMERA WASHER SPRAY" in FIG. 4).

At step S19, the controller 100 stops the outputting of the pump drive signal PK at the end of the predetermined drive period t2. Then, at step S20, it is determined whether a predetermined post-drive period (also referred to as a predetermined third time period) t3 shown in FIG. 4 has elapsed since the end of the predetermined drive period t2. When it is determined that the predetermined post-drive period t3 has elapsed since the end of the predetermined drive period t2 at step S20 (i.e., YES at step S20), the operation proceeds to step S21.

At step S21, the controller 100 stops the outputting of the valve drive signal BK to stop the driving of the solenoid switch valve B (thereby to switch the flow passage of the washer fluid received from the electric pump 20 to the rear washer nozzle N1 side), and the operation proceeds to step S22.

In the above described process, as shown in FIG. 4, the controller 100 drives the electric pump 20 only for the predetermined drive period t2 to feed the washer fluid to the rear washer nozzle N1. Thereafter, when the predetermined post-drive period t3 has elapsed since the end of the predetermined drive period t2, the controller 100 stops the outputting of the valve drive signal BK and switches the solenoid switch valve B to the rear washer nozzle N1 side.

Thereafter, at step S22, it is determined whether a predetermined pre-restart period (also referred to as a predetermined fourth time period) t4 shown in FIG. 4 has elapsed since an end of the predetermined post-drive period t3. When it is determined that the predetermined pre-restart period t4 has elapsed since the end of the predetermined post-drive period t3 at step S22 (i.e., YES at step S22), the operation proceeds to step S14. At step S14, the controller 100 outputs the pump drive signal PK and proceeds to step S15. At step S15, the controller 100 outputs the wiper drive signal WK. Thereby, the electric pump 20 is restarted, i.e., is driven once again, and the washer fluid is sprayed from the rear washer nozzle N1 over the rear window glass 4. Also, the rear wiper motor M1 is driven, so that the wiper 7 is driven to wipe the rear window glass 4.

That is, as shown in FIG. 4, even after the end of the predetermined post-drive period t3, the controller 100 outputs the pump drive signal PK once again to restart the driving of the electric pump 20 as long as the washer signal W is continuously inputted to the controller 100 since the beginning of the pre-drive period t1. Specifically, when the predetermined pre-restart period t4 has elapsed since the end of the predetermined post-drive period t3, the controller 100 outputs the pump drive signal PK to restart the driving of the electric pump 20. Furthermore, the controller 100 outputs the wiper drive signal WK to drive the rear wiper motor M1 synchronously with the restart of the driving of the electric pump 20. Therefore, the washer fluid is sprayed from the rear washer nozzle N1 over the rear window glass 4 (see "WINDOW WASHER SPRAY" in FIG. 4), and the rear window glass 4 is wiped with the wiper 7.

Next, advantages of the present embodiment will be described.

(1) The washer apparatus of the present embodiment includes the solenoid switch valve B, which can switch the flow passage of the washer fluid pumped from the electric pump 20 between the washer nozzle N1 side (the first connecting state) and the camera washer nozzle N2 side (the second connecting state). Therefore, the onboard camera 10 can be washed by using the preexisting electric pump 20 (the washer pump P) and the preexisting tank T, which are initially provided for the purpose of washing the vehicle window glass, without requiring an extra electric pump and an extra tank. Thus, the required installation space of the washer apparatus can be reduced or minimized, and the costs can be reduced or minimized.

Furthermore, the washer apparatus of the present embodiment includes the controller 100, which executes the switching of the flow passage of the washer fluid in the stop state of the electric pump 20. Therefore, the switching of the flow passage of the washer fluid can be quickly executed by the solenoid switching valve B in the state where the pressure in the conduit is sufficiently low (the load being small). In this way, for example, the electric power, which is required to drive the solenoid switch valve B, can be reduced or minimized, and the good switching response can be achieved.

(2) In the state where the signal (the reverse mode signal X), which indicates that the vehicle is in the reverse drive mode, is inputted to the controller 100, when the command signal (the washer signal W) is inputted to the controller 100, the solenoid switch valve B is switched from the rear washer nozzle N1 side to the camera washer nozzle N2 side within the predetermined pre-drive period t1. Then, when the predetermined pre-drive period t1 has elapsed, the electric pump 20 is driven only for the predetermined drive period t2. Therefore, the washing of the onboard camera 10 can be executed by manipulating the washer switch SW1 in the reverse drive mode of the vehicle.

Furthermore, the electric pump 20 is not driven within the predetermined pre-drive period t1, within which the solenoid switch valve B is switched to the camera washer nozzle N2 side, even when the washer switch SW1 is turned on. That is, the electric pump 20 is driven upon the turning on of the washer switch SW1 only after the elapsing of the predetermined pre-drive period t1. Therefore, the switching of the flow passage of the washer fluid can be quickly executed in the state where the pressure in the conduit is sufficiently low (the load being small). In this way, for example, the electric power, which is required to drive the solenoid switch valve B, can be reduced or minimized, and the good switching response can be achieved. Furthermore, for example, it is possible to limit the leakage of the washer fluid (dripping of a small quantity of the washer fluid) from the rear washer nozzle N1.

(3) When the predetermined post-drive period t3 has elapsed since the end of the predetermined drive period t2, during which the electric pump 20 is driven, the solenoid switch valve B is switched to the rear washer nozzle N1 side. Therefore, the switching of the flow passage of the washer fluid can be quickly executed in the state where the pressure in the conduit is sufficiently low (the load being small). In this way, for example, the electric power, which is required to drive the solenoid switch valve B, can be reduced or minimized, and the good switching response can be achieved. Furthermore, it is possible to limit the delay in the stopping of the flow of the washer fluid in the conduit or the occurrence of the dripping of the washer fluid from the nozzle.

(4) When the input of the command signal (the washer signal W) of the washer switch SW1 to the controller 100 is continuously maintained since the start of the outputting of the valve drive signal BK (i.e., since the initial time point of receiving the washer signal W in the presence of the input of the reverse mode signal X to the controller 100) even after the end of the predetermined post-drive period t3 (more specifically after the end of the pre-restart period t4), the electric pump 20 is restarted in the period, during which the washer signal W is continuously inputted to the controller 100. Therefore, in the reverse drive mode of the vehicle, when the washer switch SW1 is continuously turned on, the electric pump 20 is initially connected to the camera washer nozzle N2 and feeds the washer fluid to the camera washer nozzle N2 (see "CAMERA WASHER SPRAY" in FIG. 4). Then, the electric pump 20 is automatically connected to the rear washer nozzle N1 and feeds the washer fluid to the rear washer nozzle N1 (see "WINDOW WASHER SPRAY" in FIG. 4). In this way, the spraying of the washer fluid over the onboard camera 10 and the spraying of the washer fluid over the rear window glass 4 can be executed through the single manipulation of the switch without requiring the annoying separate manipulations of the switch(es) by the driver.

(5) Furthermore, the driving of the electric pump 20 is restarted after the end of the predetermined pre-restart period t4, which starts from the end of the predetermined post-drive period t3. Therefore, the switching of the flow passage of the washer fluid can be quickly executed in the state where the pressure in the conduit is sufficiently low (the load being small). In this way, for example, the electric power, which is required to drive the solenoid switch valve B, can be reduced or minimized, and the good switching response can be achieved. Furthermore, for example, it is possible to limit the leakage of the washer fluid from the camera washer nozzle N2.

(6) The rear wiper motor M1 is driven synchronously with the restart of the driving of the electric pump 20. Therefore, the clear view of the onboard camera 10 and the clear view through the rear window glass 4 can be achieved without requiring the annoying separate manipulations of the switches to execute the spraying of the washer fluid over the onboard camera 10 and the spraying of the washer fluid over the rear window glass 4. Furthermore, although the rear wiper motor M1 is driven based on the command signal outputted from the washer switch SW1, the rear wiper motor M1 is not driven at the time of washing the onboard camera 10, and thereby the wiping movement of the wiper 7 does not occur. Thus, it is possible to limit occurrence of the wiping movement of the wiper 7 in the state where the surface of the rear window glass 4 is dried out.

The first embodiment may be modified as follows.

In the first embodiment, the controller 100 stops the electric pump 20 at the time of switching the solenoid switch valve B to the camera washer nozzle N2 side and at the time of switching the solenoid switch valve B to the rear washer nozzle N1 side. Alternatively, the controller 100 may be configured to stop the electric pump 20 only at one of the time of switching the solenoid switch valve B to the camera washer nozzle N2 side and the time of switching the solenoid switch valve B to the rear washer nozzle N1 side.

In such a case, it is desirable that the electric pump 20 is stopped at the time of switching the solenoid switch valve B to the rear washer nozzle N1 side. Specifically, it is desirable that the electric pump 20 is driven only for the predetermined drive period t2 upon the inputting of the washer signal W without setting the predetermined pre-drive period t1, and then the solenoid switch valve B is switched to the rear washer nozzle N1 side in the state where the electric pump 20 is stopped after the end of the predetermined post-drive period t3, which starts from the end of the predetermined drive period t2.

In the first embodiment, the driving of the electric pump 20 is restarted when the command signal (the washer signal W) of the washer switch SW1 is continuously inputted to the controller 100 even after the end of the predetermined post-drive period t3. Alternatively, the restart of the driving of the electric pump 20 may be eliminated.

In the first embodiment, the rear wiper motor M1 is driven synchronously with the restart of the driving of the electric pump 20. Alternatively, this synchronous driving of the rear wiper motor M1 may be eliminated. Further alternatively, the automatic driving of the rear wiper motor M1 (the automatic driving the rear wiper motor M1 for a predetermined time period) after the restart of the driving of the electric pump 20 may be delayed for a predetermined time period since the restart of the driving of the electric pump 20 or may be executed through manipulation of the rear wiper switch 15.

In the first embodiment, the washer apparatus uses the tank T, the pump motor M2 and the washer pump P (the electric pump 20), which are initially provided to feed the washer fluid over the rear window glass 4. Alternatively, the washer apparatus of the first embodiment may use a tank, a pump motor and a washer pump, which are initially provided to feed washer fluid to a front window glass (windshield) of the vehicle. Furthermore, in terms of space saving, it is advantageous to commonly use a single tank for the front side (the front window glass washing) and the rear side (the rear window glass washing and the onboard camera washing) of the vehicle.

In the first embodiment, the portion of the electric current to be supplied to the back lamp BL upon the manipulation of the shift lever 3 into the reverse position is supplied to the controller 100 as the reverse mode signal X at the time of manipulating the shift lever 3 to the reverse position. Alternatively, in a case where a warning buzzer, which notifies the backward movement of the vehicle, is provided in the vehicle, when the shift lever 3 is shifted to the reverse position, the warning buzzer may be turned on, and at the same time, a portion of the electric current to be supplied to the warning buzzer may be supplied to the controller 100 as the reverse mode signal X.

Here it should be understood that a separate dedicated current, which is different from the electric current supplied to the back lamp BL, may be supplied to the controller 100 as the reverse mode signal X.

In the first embodiment, the subject window glass of the vehicle to be washed is the rear window glass 4, and the window glass washer nozzle is the rear washer nozzle N1. Alternatively, the subject window glass of the vehicle to be washed may be changed to a front window glass (windshield) of the vehicle, and a front washer nozzle may be used as the window glass washer nozzle (in a manner similar to a modification of a fourth embodiment shown in FIG. 11 discussed below).

Second Embodiment

Figure 5:
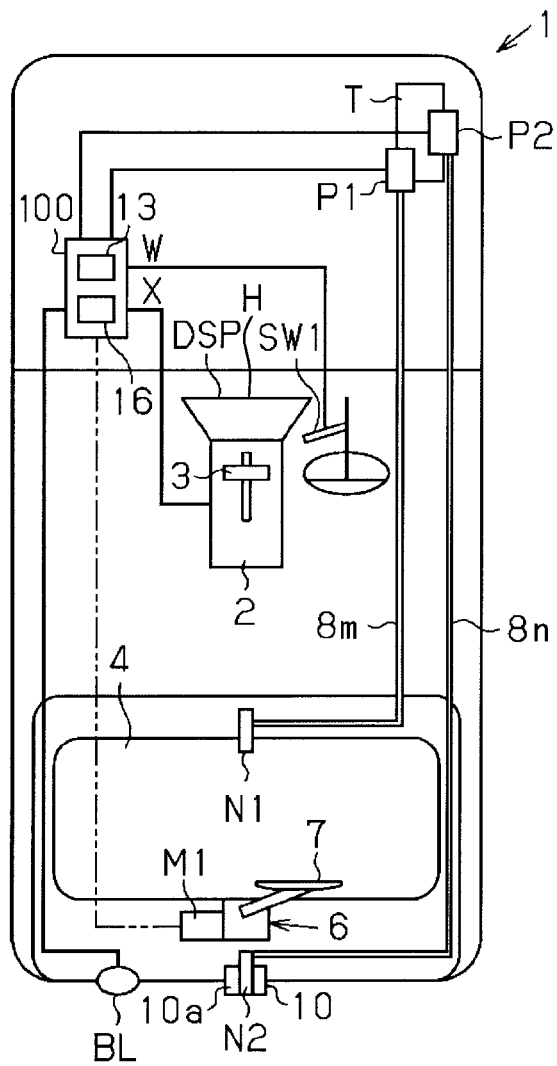
FIG. 5 is a schematic diagram showing a vehicle having a washer apparatus according to a second embodiment of the present disclosure.

A washer apparatus for the vehicle according to a second embodiment of the present disclosure will be described with reference to FIGS. 5 and 6. In the second embodiment, the components, which are similar to those of the first embodiment will be indicated by the same reference numerals and will not be described redundantly.

In the present embodiment, the rear washer nozzle N1 is connected to a first electric pump P1 located in the front engine room of the vehicle 1 through a conduit (first conduit) 8m. The first electric pump P1 feeds washer fluid stored in the tank T located in the front engine room to the rear washer nozzle N1 through the conduit 8m.

The camera washer nozzle N2 is connected to a second electric pump P2 located in the front engine room of the vehicle 1 through a conduit (second conduit) 8n. The second electric pump P2 feeds the washer fluid stored in the tank T to the camera washer nozzle N2 through the conduit 8n.

The washer switch SW1 outputs the command signal (washer signal W), which drives each corresponding one of the first and second electric pumps P1, P2, upon manipulation of the washer switch SW1 by the driver.

Furthermore, the controller 100 is provided in the vehicle 1. The controller 100 drives the first electric pump P1 when the command signal (washer signal W) is inputted to the controller 100 in the absence of input of the reverse mode signal X, which indicates the reverse drive mode of the vehicle 1, to the controller 100. Furthermore, the controller 100 drives the second electric pump P2 when the command signal (washer signal W) is inputted to the controller 100 in the presence of the input of the reverse mode signal X to the controller 100.

Figure 6:
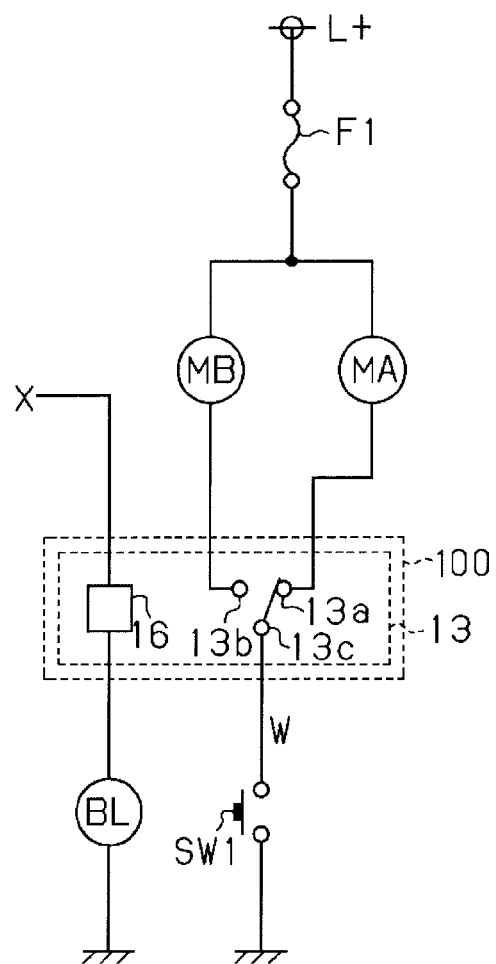
FIG. 6 is a circuit diagram showing an electrical structure of a controller of the second embodiment.

An electrical structure of the controller 100 is different from that of the first embodiment and is shown in FIG. 6.

The controller 100 includes a back lamp relay 16, which is turned on when a magnetizing coil is excited by the reverse mode signal X that is the electric signal generated at the time of placing the shift lever 3 in the reverse position. The back lamp BL is connected to the back lamp relay 16. When the back lamp relay 16 is turned on, i.e., is closed, the electric current is supplied to the back lamp BL through the back lamp relay 16 to turn on the back lamp BL.

The controller 100 further includes a switch relay 13. The switch relay 13 includes a switch that connects a common contact (also referred to as a c-contact) 13c, which has been connected to a first contact (also referred to as an a-contact) 13a, to a second contact (also referred to as a b-contact) 13b upon inputting of the reverse mode signal X to the back lamp relay 16 (simultaneously with the turning on of the back lamp relay 16).

The first contact 13a of the switch relay 13 is connected to one terminal of a first electric motor MA, which is a drive source of the first electric pump P1. The second contact 13b of the switch relay 13 is connected to one terminal of a second electric motor MB, which is a drive source of the second electric pump P2. The other terminal of the first electric motor MA and the other terminal of the second electric motor MB are connected to the plus (+) power supply line L+ through a fuse F1. The common contact 13c of the switch relay 13 is connected to a ground through the washer switch SW1.

Therefore, when the reverse mode signal X is not inputted to the controller 100, the common contact 13c is connected to the first contact 13a. In this state, when the washer switch SW1 is turned on (i.e., is closed), that is when the command signal (washer signal W) is inputted to the controller 100 by connecting the common contact 13c to the ground, the first electric motor MA and thereby the first electric pump P1 are driven.

Furthermore, when the reverse mode signal X is inputted to the controller 100, the common contact 13c is connected to the second contact 13b. In this state, when the washer switch SW1 is turned on, i.e., when the command signal (washer signal W) is inputted to the controller 100 by connecting the common contact 13c to the ground, the second electric motor MB and thereby the second electric pump P2 are driven.

Next, the operation of the present embodiment will be described.

For instance, in a state where the shift lever 3 is placed in the other position, which is other than the reverse position, when the washer switch SW1 is in the OFF state, the reverse mode signal X and the command signal (washer signal W) are not inputted to the controller 100. Thereby, although the common contact 13c is connected to the first contact 13a, the electric current is not supplied to the first electric motor MA, and thereby the first electric pump P1 is not driven.

Furthermore, for instance, in the state where the shift lever 3 is placed in the other position, which is other than the reverse position, when the washer switch SW1 is turned on (placed into the ON state), the command signal (washer signal W) is inputted to the controller 100 in the absence of the input of the reverse mode signal X to the controller 100. Thereby, in the state where the common contact 13c is connected to the first contact 13a, the electric current is supplied to the first electric motor MA to drive the first electric pump P1. Thus, the washer fluid, which is stored in the tank T, is fed to the rear washer nozzle N1 through the conduit 8m and is sprayed over the rear window glass 4 through the rear washer nozzle N1.

Furthermore, for instance, in the state where the shift lever 3 is placed in the reverse position, when the washer switch SW1 is turned on, the command signal (washer signal W) is inputted to the controller 100 in the presence of the input of the reverse mode signal X to the controller 100. Thereby, in the state where the common contact 13c is connected to the second contact 13b, the electric current is supplied to the second electric motor MB to drive the second electric pump P2. Thus, the washer fluid, which is stored in the tank T, is fed to the camera washer nozzle N2 through the conduit 8n and is sprayed over the glass cover 10a of the onboard camera 10 through the camera washer nozzle N2.

Next, advantages of the second embodiment will be described.

(1) It is only required to provide the single common washer switch SW1, and thereby it is not required to provide two separate switches for the camera wash operation and the window glass wash operation, respectively. Thus, the required signal lines can be shortened (in comparison to the case where the two separate switches are provided in parallel). Also, when a preexisting washer switch is used as the washer switch SW1 of the present embodiment, each of the camera wash operation and the window glass wash operation can be performed with the simple and low cost structure. Furthermore, since the required operation of the driver of the vehicle can be performed with the single washer switch SW1, there is less confusion about the wash operation (e.g., less need to recall the location of the camera wash switch or manipulation method of the camera wash switch unlike the case of providing the two separate switches for the camera wash operation and the window glass wash operation). Thereby, the manipulatability can be improved.

(2) In the present embodiment, although not discussed above, the quantity and the pressure of the washer fluid fed to the rear washer nozzle N1 can be set differently from the quantity and the pressure of the washer fluid fed to the camera washer nozzle N2 by changing the specification of the first electric pump P1 from the specification of the second electric pump P2 to execute the appropriate camera wash and the appropriate window glass wash. For example, in the second embodiment, it is desirable to feed the high pressure washer fluid to the camera washer nozzle N2 since the glass cover 10a of the onboard camera 10 is washed only by the spraying of the washer fluid. In such a case, the specification of the second pump P2 is set to enable the spraying of the high pressure washer fluid through the camera washer nozzle N2.

(3) The reverse mode signal X, which indicates the reverse drive mode of the vehicle, is the electric signal indicating the positioning of the shift lever 3 in the reverse position and is directly outputted in connection with the movement of the shift lever 3, which is manipulated by the driver of the vehicle on his/her will. Therefore, it is possible to perform the quick and accurate control operation, which meets the driver's will for driving the vehicle backward.

Third Embodiment

A washer apparatus for the vehicle according to a third embodiment of the present disclosure will be described with reference to FIGS. 7 and 8. The third embodiment is a modification of the second embodiment. Therefore, similar components, which are similar to those of the second embodiment, will be indicated by the same reference numerals and will not be described redundantly. The third embodiment mainly differs from the second embodiment with respect to use of a double outlet pump DP as an electric pump and the controller 100 of a different circuit structure, which is different from that of the controller 100 of the second embodiment due to the use of the double outlet pump DP.

Figure 7:
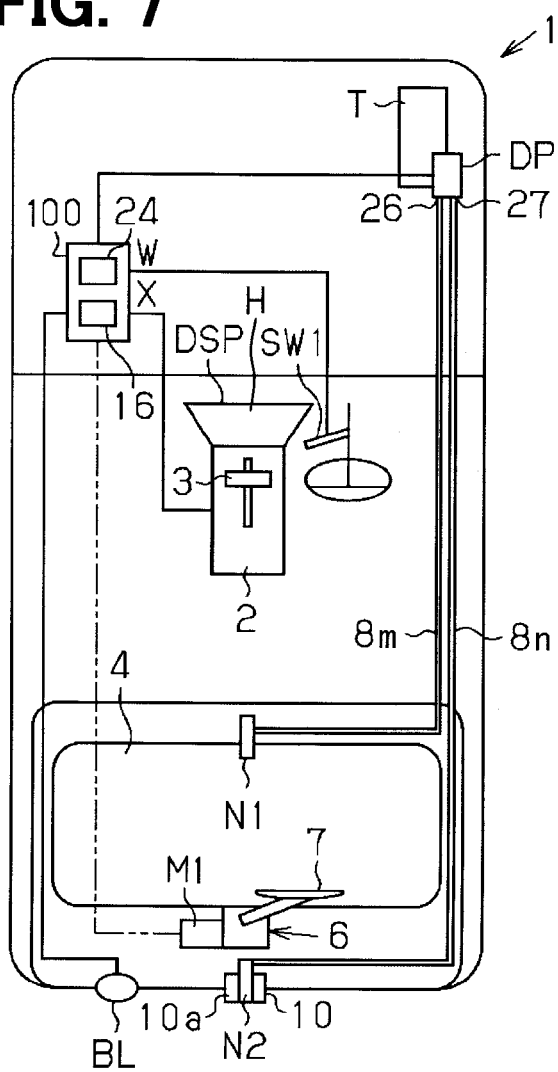
FIG. 7 is a schematic diagram showing a vehicle having a washer apparatus according to a third embodiment of the present disclosure.

With reference to FIG. 7, the double outlet pump DP includes an electric pump MC (see FIG. 8), which is rotatable in both of a normal rotational direction and a backward rotational direction. The washer fluid is selectively discharged from the double outlet pump DP through a corresponding one of two outlets 26, 27 depending on the rotational direction of the electric motor MC. The double outlet pump DP of the present embodiment is of a known type and includes a valve structure, which closes one of the outlets 26, 27 through use of a pressure difference between the outlets 26, 27 at the time of rotating an impeller by the electric motor MC in the normal rotational direction or the backward rotational direction.

The rear washer nozzle N1 is connected to the outlet 26 through the conduit 8m, and the camera washer nozzle N2 is connected to the outlet 27 through the conduit 8n.

Figure 8:
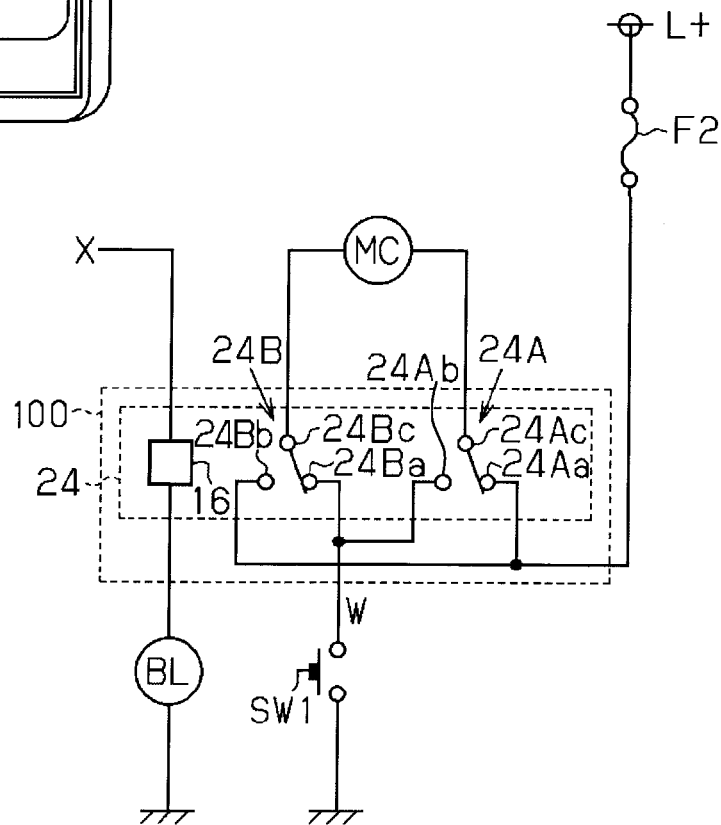
FIG. 8 is a circuit diagram showing an electrical structure of a controller of the third embodiment.

As shown in FIG. 8, the controller 100 includes the back lamp relay 16, which is turned on upon excitation of the magnetizing coil thereof through the inputting of the reverse mode signal X. The back lamp BL is connected to the back lamp relay 16. When the back lamp relay 16 is turned on, the electric current is supplied to the back lamp BL through the back lamp relay 16 to turn on the back lamp BL.

The controller 100 includes a switch relay 24 that has two switches 24A, 24B. In each of the switches 24A, 24B, a common contact (also referred to as a c-contact) 24Ac, 24Bc, which has been connected to a first contact (also referred to as an a-contact) 24Aa, 24Ba, is connected to a second contact (also referred to as a b-contact) 24Ab, 24Bb upon inputting of the reverse mode signal X to the back lamp relay 16 (simultaneously with the turning on of the back lamp relay 16).

In the switch relay 24, the first contact 24Aa of the switch 24A is connected to the second contact 24Bb of the other switch 24B and is also connected to the plus (+) power supply line L+ through a fuse F2. Furthermore, the second contact 24Ab of the switch 24A is connected to the first contact 24Ba of the other switch 24B and is also connected to the ground through the washer switch SW1. The common contact 24Ac of the switch 24A is connected to one terminal of the electric motor MC, and the common contact 24Bc of the other switch 24B is connected to the other terminal of the electric motor MC.

Thus, in the absence of the reverse mode signal X, the common contact 24Ac, 24Bc of each of the switches 24A, 24B is connected to the first contact 24Aa, 24Ba of the switch 24A, 24B. In this state, when the washer switch SW1 is turned on (when the washer signal W is inputted), the electric motor MC is rotated in the normal rotational direction. Therefore, the washer fluid is fed from the outlet 26 to the rear washer nozzle N1.

Furthermore, in the presence of the reverse mode signal X, the common contact 24Ac, 24Bc of each of the switches 24A, 24B is connected to the second contact 24Ab, 24Bb of the switch 24A, 24B. In this state, when the washer switch SW1 is turned on (when the washer signal W is inputted), the electric motor MC is rotated in the backward rotational direction. Therefore, the washer fluid is fed from the outlet 27 to the camera washer nozzle N2. Therefore, even in the washer apparatus of the third embodiment, the washing operation, which is similar to that of the second embodiment, is performed.

In the third embodiment, the advantages discussed in the sections (1), (3) of the second embodiment, can be achieved. Furthermore, the following advantage can be achieved in the third embodiment.

In the third embodiment, the double outlet pump DP is used as the electric pump. Therefore, in comparison to the case where the two separate electric pumps are used (e.g., the case of the second embodiment), the number of the electric motors can be reduced (reduced to the single electric motor MC) in the third embodiment.

The second and third embodiments may be modified as follows.

In each of the second and third embodiments, although not discussed above, the controller 100 (wash control means) may be modified to drive the wiper motor M1 when the controller 100 receives the command signal (washer signal W) in the absence of the input of the reverse mode signal X. In this way, when the washer fluid is sprayed over the rear window glass 4, the wiper 7 is synchronously driven. Thereby, the washer fluid, which is sprayed over the rear window glass 4, can be quickly wiped with the wiper 7. Furthermore, the driving of the wiper motor M1 (driving of the wiper 7) may be executed simultaneously with the spraying of the washer fluid over the rear window glass 4. Alternatively, the driving of the wiper motor M1 (driving of the wiper 7) may be executed after elapsing of a predetermined time period since the end of the spraying of the washer fluid over the rear window glass 4.

In each of the second and third embodiments, the controller 100 drives the electric pump (the first electric pump P1, the second electric pump P2, the double outlet pump DP) for the time period, which is the same as the time period of turning on of the washer switch SW1. However, the present disclosure is not limited to this. For instance, the wash control means may use, for example, a timer to drive the electric pump only for a predetermined time period. Also, the circuit structure of the controller 100 may be changed.

In each of the second and third embodiments, the reverse mode signal X, which indicates that the vehicle 1 is in the reverse drive mode, is the electric signal that is outputted in response to the positioning of the shift lever 3 in the reverse position. Alternatively, it is possible to use a signal, which indicates that the vehicle is in the reverse drive mode (backwardly movable state). For example, it is possible to use a sensing signal of a sensor (serving as a reverse drive mode sensor), which indicates placement of the reverse gear in use after mechanical shifting of the reverse gear.

In each of the second and third embodiments, the subject window glass of the vehicle to be washed is the rear window glass 4, and the window glass washer nozzle is the rear washer nozzle N1. Alternatively, the subject window glass of the vehicle to be washed may be changed to a front window glass (windshield) of the vehicle, and a front washer nozzle may be used as the window glass washer nozzle.

In the second embodiment, the single tank T is used. Alternatively, two separate tanks may be provided to the electric pumps (the first and second electric pumps P1, P2), respectively.

Fourth Embodiment

Figure 9A:
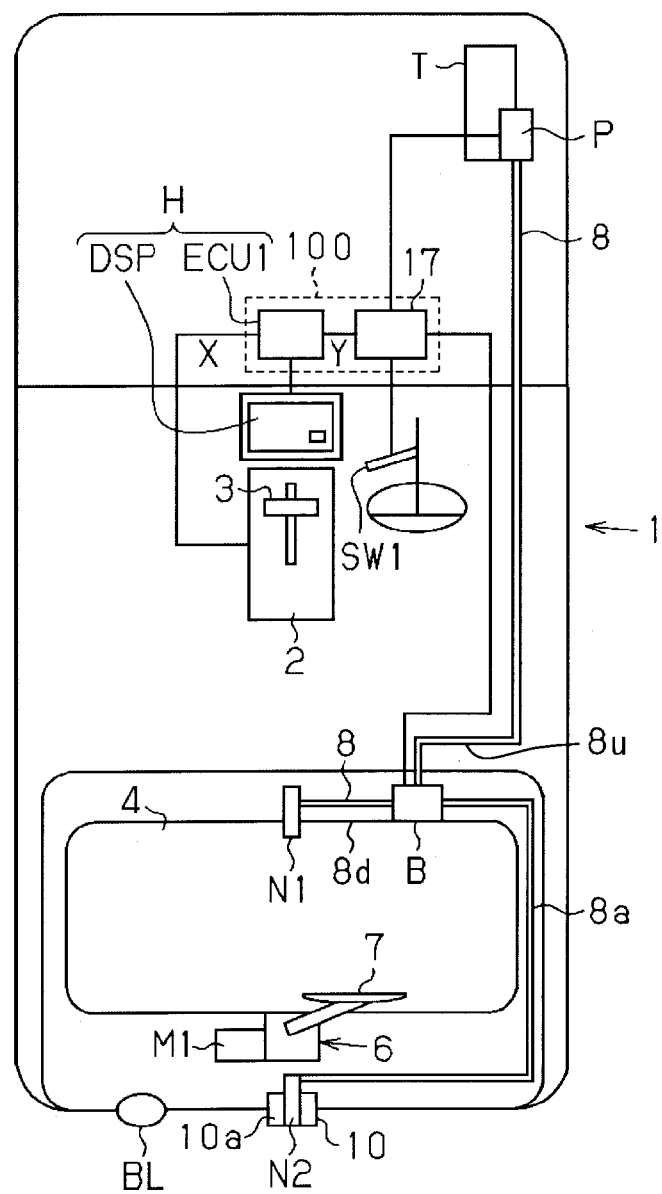
FIG. 9A is a schematic diagram of a vehicle having a washer apparatus for the vehicle according to a fourth embodiment of the present disclosure.

A washer apparatus of the vehicle according to a fourth embodiment of the present disclosure, which is a modification of the first embodiment, will be described with reference to FIGS. 9A to 10. In the following discussion, the components, which are similar to those of the first embodiment, are indicated by the same reference numerals and will not be described redundantly.

In the fourth embodiment, the display device H includes the display (screen) DSP and a display controller ECU1. The display DSP is exposed at the driver's seat side. The display controller ECU1 is provided integrally with the display DSP and controls the display DSP.

The vehicle 1 has the controller 100, which is modified from that of the first embodiment, as discussed in detail below. In response to the input of the reverse mode signal X, the controller 100 displays the captured image, which is captured by the onboard camera 10, on the display DSP and displays a camera wash touch panel switch TSW along with the captured image (see FIG. 9B). Also, the controller 100 drives the electric pump P to feed the washer fluid to the camera washer nozzle N2 in response to the manipulation (turning on) of the touch panel switch TSW.

Specifically, the controller 100 of the present embodiment includes the display controller ECU1 of the display device H and a wash drive controller 17. The wash drive controller 17 includes a circuit having a relay or an electronic circuit and drives the electric pump P and the solenoid switch valve B.

The reverse mode signal X is the signal, which indicates that the vehicle 1 is in the reverse drive mode (the backwardly movable state). In the present embodiment, the reverse mode signal X is the electric signal indicating the positioning of the shift lever 3 in the reverse position and is directly inputted to the display controller ECU1 or is indirectly inputted to the display controller ECU1 through an undepicted vehicle electronic control unit (ECU) in connection with the movement of the shift lever 3, which is manipulated by the driver of the vehicle.

Figure 9B:
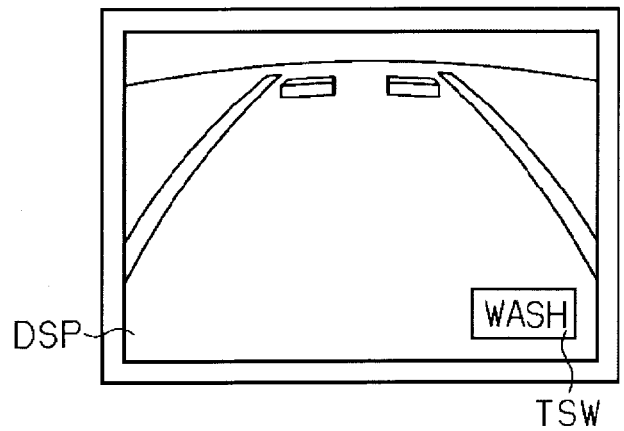
FIG. 9B is a schematic diagram showing a display of the fourth embodiment.

When the display controller ECU1 of the controller 100 receives the reverse mode signal X, the display controller ECU1 displays the captured image, which is captured by the onboard camera 10, on the display DSP and also displays the camera wash touch panel switch TSW on the display DSP along with the captured image, as shown in FIG. 9B. When the touch panel switch TSW is manipulated (i.e., is turned on to output a command signal) by the driver of the vehicle, the touch panel switch TSW, more specifically the display controller ECU1, which receives the command signal from the touch panel switch TSW, outputs a camera wash drive signal Y to the wash drive controller 17. When the touch panel switch TSW is manipulated, i.e., when the driver of the vehicle touches the touch panel switch TSW to turn on the same, the display controller ECU1 of the present embodiment outputs the camera wash drive signal Y only for a predetermined spray period (e.g., three seconds).

When the wash drive controller 17 of the controller 100 receives the camera wash drive signal Y, the wash drive controller 17 switches the solenoid switch valve B to the second connecting state, in which the washer fluid received from the electric pump P is fed to the camera washer nozzle N2. When the wash drive controller 17 of the present embodiment receives the camera wash drive signal Y, the wash drive controller 17 drives the electric pump P only for the period (about three seconds), through which the camera wash drive signal Y is continuously received.

When the washer switch SW1 is manipulated, i.e., is turned on to output the command signal (the washer signal W) in the state where the camera wash drive signal Y is not inputted to the wash drive controller 17, the wash drive controller 17 drives the electric pump P while maintaining the current state (the first connecting state) of solenoid switch valve B (without shifting the solenoid switch valve B), in which the washer fluid received from the electric pump P is fed to the rear washer nozzle N1 through the solenoid switch valve B.

Next, the operation of the present embodiment will be described.

For instance, when the shift lever 3 is manipulated and is placed in the reverse position, the captured image, which is captured by the onboard camera 10, is displayed on the display DSP, and the camera wash touch panel switch TSW is displayed on the display DSP, as shown in FIG. 9B. Then, when the touch panel switch TSW is manipulated (i.e., is turned on to output the command signal) by the driver, as shown in FIG. 10, the solenoid switch valve B is shifted to the second connecting state (camera side), in which the washer fluid received from the electric pump P is fed to the camera washer nozzle N2, and the electric pump P is driven. Thus, the washer fluid is sprayed from the camera washer nozzle N2 over the glass cover 10a of the onboard camera 10 (see "CAMERA WASHER SPRAY" in FIG. 10).

Furthermore, in the state where the shift lever 3 is not placed in the reverse position, or in the state where the camera wash touch panel switch TSW is not manipulated (i.e., is not turned on) by the driver, when the washer switch SW1 is manipulated, i.e., is turned on to output the command signal (the washer signal W) by the driver, the electric pump P is driven in the first connecting state (window side) of the solenoid switch valve B without shifting the solenoid switch valve B. Therefore, the washer fluid is sprayed from the rear washer nozzle N1 over the rear window glass 4 (see "WINDOW WASHER SPRAY" in FIG. 10).

Next, advantages of the present embodiment will be described.

(1) For example, when the driver of the vehicle realizes that the glass cover 10a of the onboard camera 10 is stained with, for example, dirt, dust or the like by watching the captured image of the onboard camera 10, which is displayed on the display DSP, the driver can execute the wash operation of the glass cover 10a of the onboard camera 10 by simply manipulating the camera wash touch panel switch TSW (i.e., touching the camera wash touch panel switch TSW to turn on the same), which is displayed on the display DSP. In this way, it is possible to avoid the erroneous manipulation of the switch or the confusion (e.g., confusion with respect to the identification of the camera washer switch, confusion with respect to operation of the camera washer switch), which would occur in the case where the mechanical camera wash switch is provided to the lever, on which other washer system switches (e.g., the wiper switch, the washer switch SW1) are also integrally provided. Furthermore, since the camera wash switch is provided as the camera wash touch panel switch TSW (requiring only the modification of the software of the display controller ECU1), it is possible to reduce or minimize the costs of the washer apparatus for the vehicle in comparison to the case where the mechanical camera wash switch is provided.

(2) In the fourth embodiment, the electric pump P can be commonly used for the window glass wash operation and the camera wash operation. Therefore, the costs can be reduced in comparison to the case where two electric pumps are provided for the window glass wash operation and the camera wash operation, respectively. Furthermore, the upstream side portion 8u of the main conduit 8, which extends from the electric pump P to the branch point (the solenoid switch valve B), can be used commonly for both of the window glass wash operation and the camera wash operation. Therefore, the total length of the conduit members (e.g., hoses) can be reduced or minimized in comparison to the case where the conduit members (e.g., hoses) are provided separately for the window glass wash operation and the camera wash operation. In the present embodiment, the location of the branch point, at which the solenoid switch valve B is provided, is at the rear side of the vehicle. Therefore, the length of the branch conduit 8a can be substantially reduced, and thereby the total length of the conduit members (e.g., hoses) can be substantially reduced in comparison to the case where the conduit members (e.g., hoses) are separately provided for the window glass wash operation and the camera wash operation.

(3) When the camera wash touch panel switch TSW is manipulated (i.e., is turned on to output the drive signal) by the driver, the washer fluid is fed to the camera washer nozzle N2 only for the predetermined spray period (e.g., three seconds). Therefore, the glass cover 10a of the onboard camera 10 can be effectively washed when the driver instantaneously touches the touch panel switch TSW.

The fourth embodiment of the present disclosure may be modified as follows.

In the fourth embodiment, the subject window glass of the vehicle to be washed is the rear window glass 4, and the window glass washer nozzle is the rear washer nozzle N1. Alternatively, the subject window glass of the vehicle to be washed may be changed to a front window glass (windshield) of the vehicle, and a front washer nozzle may be used as the window glass washer nozzle.

Figure 11:
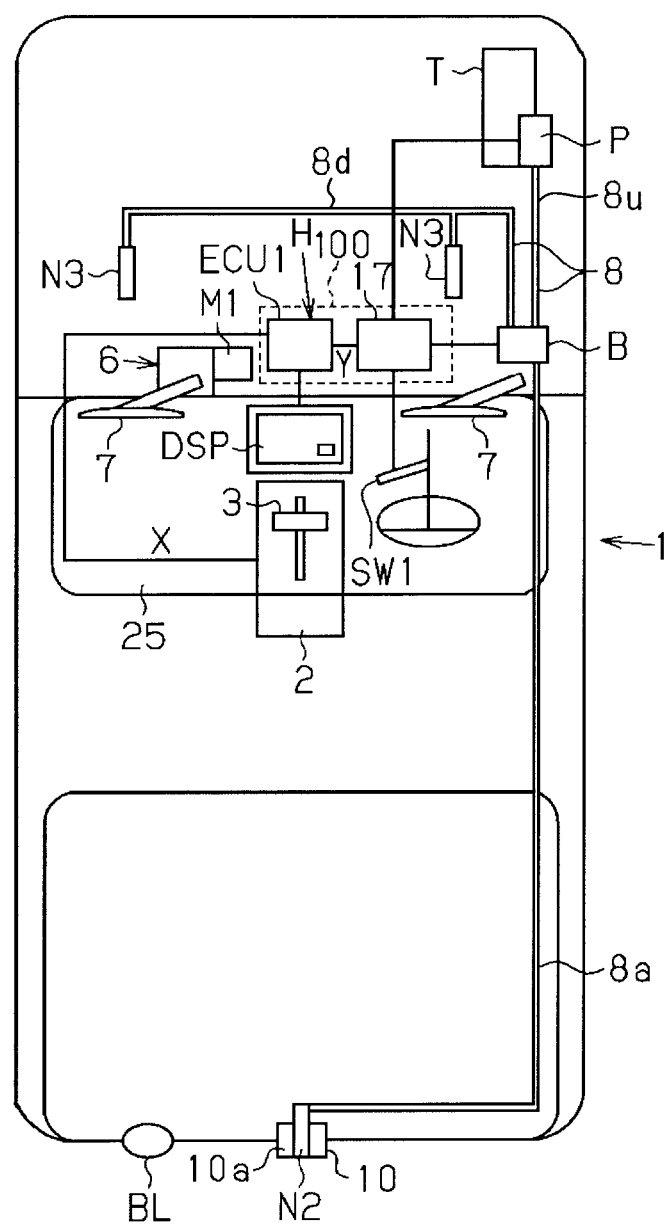
FIG. 11 is a schematic diagram of a vehicle having a washer apparatus according to a modification of the fourth embodiment.

Specifically, the fourth embodiment may be modified in a manner shown in FIG. 11. In this modification (see FIG. 11), two front washer nozzles N3, which serve as the window glass washer nozzles, are provided at the lower side of the front window glass (windshield) 25. A nozzle opening of each front washer nozzle N3 is directed to the front window glass 25 located above the washer nozzle N3, and the washer fluid, which is supplied from the solenoid switch valve B to the front washer nozzle N3 through the downstream side portion 8d of the main conduit 8, is sprayed from the nozzle opening of the front washer nozzle N3 over a wiping surface of the front window glass 25. Even with this modification, the advantages, which are similar to those discussed in the fourth embodiment, can be achieved.

In this modification, the wiper device 6 of the fourth embodiment is placed at the lower side of the front window glass 25. When the wiper motor M1 of this wiper device 6 is driven, two wipers (wiper blades) 7 are swung to wipe the external surface (wiping surface) of the front window glass 25. In the fourth embodiment as well as in this modification (see FIG. 11), at the time of spraying of the washer fluid (e.g., immediately after the spraying of the washer fluid) from the corresponding window glass washer nozzle (i.e., the rear washer nozzle N1 or the front washer nozzles N3), the wiper motor M1 may be automatically driven only for a predetermined time period, like in the first embodiment.

In the fourth embodiment, when the touch panel switch TSW is manipulated (i.e., is touched by the driver to turn on the same thereby outputting the command signal), the controller 100 switches the solenoid switch valve B to the second connecting state, in which the washer fluid received from the electric pump P is fed to the camera washer nozzle N2. However, the present disclosure is not limited to this. For example, the solenoid switch valve B may be switched to the second connecting state, in which the washer fluid is fed to the camera washer nozzle N2, based on the input of the reverse mode signal X. In this way, in response to the manipulation of the shift lever 3 to the reverser position, the solenoid switch valve B is switched before the driving of the electric pump P, which is executed upon the manipulation of the camera wash touch panel switch TSW. Thereby, for example, it is possible to limit dripping of a small quantity of the washer fluid from the rear washer nozzle N1.

In the fourth embodiment, the controller 100 drives the electric pump P only for the predetermined spray period (e.g., three seconds) based on the manipulation of the camera wash touch panel switch TSW. However, the drive period of the electric pump P may be modified. For example, the controller 100 may drive the electric pump P to feed the washer fluid to the camera washer nozzle N2 for the period, through which the camera wash touch panel switch TSW is continuously manipulated by the driver (continuously touched by the driver to turn on the same), as shown in FIG. 12. In this way, the driver can maintain the washing of the glass cover 10a of the onboard camera 10 while watching the image (the captured image of the onboard camera) displayed on the display DSP until the glass cover 10a of the onboard camera 10 is cleaned with the washer fluid.

Furthermore, the predetermined spray period (e.g., three seconds) may be freely changed by the driver through manipulation of, for example, a time setting touch panel switch displayed on the display DSP. In this way, the driver of the vehicle can freely change the wash period (the spray period) depending on the state of the vehicle or his/her preference. Furthermore, when the time setting touch panel switch is used, the costs of the washer apparatus for the vehicle can be reduced or minimized in comparison to a case where a mechanical time setting switch is provided.

In the fourth embodiment, the present disclosure is implemented on the washer apparatus for the vehicle having the solenoid switch valve B (the switching device) and the rear washer nozzle N1 (the window glass washer nozzle). Alternatively, the present disclosure may be implemented on a washer apparatus for the vehicle that washes only the glass cover 10a of the onboard camera 10. For example, an electric pump, which pumps the washer fluid to the rear washer nozzle N1, and an electric pump, which pumps the washer fluid to the camera washer nozzle N2, may be separately provided. In such a case, when the camera wash touch panel switch TSW is manipulated by the driver of the vehicle, the electric pump, which pumps the washer fluid to the camera washer nozzle N2, may be driven. Furthermore, it is possible to use, for example, a double outlet pump (electric pump), which can selectively discharge the washer fluid from one of two outlets of the double outlet pump depending on a rotational direction of an electric motor thereof that is rotatable in both of a normal rotational direction and a backward rotational direction. In such a case, when the camera wash touch panel switch TSW is manipulated, the washer fluid is fed from the double outlet pump to the camera washer nozzle N2 side.

In each of the above embodiments, the reverse mode signal X, which indicates that the vehicle 1 is in the reverse drive mode, is the electric signal that is outputted in response to the positioning of the shift lever 3 in the reverse position. Alternatively, it is possible to use a signal, which indicates that the vehicle is in the reverse drive mode (backwardly movable state). For example, it is possible to use a sensing signal, which indicates placement of the reverse gear in use after mechanical shifting of the reverse gear.

In the fourth embodiment, the captured image, which is captured by the onboard camera 10, is displayed on the display DSP based on the input of the reverse mode signal X, and the camera wash touch panel switch TSW is displayed on the DSP along with the captured image. The camera wash operation is performed based on the manipulation of the touch panel switch TSW. Alternatively, both of the touch panel switch TSW and the washer switch SW1 may be modified to function as the camera wash switch in response to the input of the reverse mode signal X. In such a case, when one of the touch panel switch TSW and the washer switch SW1 is manipulated (i.e., is turned on to output the corresponding command signal) upon the input of the reverse mode signal X, the camera wash operation may be executed.

Furthermore, any one or more of the components of any one or more of the above embodiments and modifications thereof may be combined with the components of any another one or more of the above embodiments and modifications. For instance, the touch panel switch TSW of the fourth embodiment may be applied to any one of the first to third embodiments. For instance, in the case of the first embodiment, as indicated in FIG. 4, when the driver touches the touch panel switch (touch panel sw.) TSW, the command signal (wash signal W) is outputted from the touch panel switch TSW to the controller 100. Thereby, the controller 100 outputs the valve drive signal BK to switch the solenoid switch valve B into the second connecting state (toward the camera washer nozzle N2 side) within the predetermined pre-drive period t1, and then the controller 100 outputs the pump drive signal PK to drive the electric pump 20 for the predetermined drive period t2 after the end of the pre-drive period t1, and so on. In this way, the advantages discussed in the fourth embodiment can be achieved in the first embodiment.

Additional advantages and modifications will readily occur to those skilled in the art. The present disclosure in its broader terms is therefore not limited to the specific details, representative apparatus, and illustrative examples shown and described.

What is claimed is:

1. A washer apparatus for a vehicle, comprising:
   a tank that is adapted to store washer fluid;
   a camera washer nozzle that is adapted to receive the washer fluid from the tank and to spray the washer fluid over one side of an onboard camera of the vehicle where a lens of the onboard camera is located;
   at least one window glass washer nozzle that is adapted to receive the washer fluid from the tank and to spray the washer fluid over at least one of a front window glass and a rear window glass of the vehicle;
   an electric pump that is adapted to pump the washer fluid from the tank and thereby to supply the washer fluid toward the camera washer nozzle and the at least one window glass washer nozzle;
   a main conduit that is adapted to connect between the electric pump and the at least one window glass washer nozzle to feed the washer fluid to the at least one window glass washer nozzle;
   a branch conduit that is branched from the main conduit at a branch point and is adapted to connect between an upstream side portion of the main conduit, which is located on an upstream side of the branch conduit in a flow direction of the washer fluid, and the camera washer nozzle to feed the washer fluid to the camera washer nozzle;
   a switching device that is provided at the branch point between the upstream side portion of the main conduit and the branch conduit and is adapted to switch between a first connecting state, in which the switching device connects the upstream side portion of the main conduit to the at least one window glass washer nozzle, and a second connecting state, in which the switching device connects the upstream side portion of the main conduit to the camera washer nozzle;
   a washer switch that is adapted to be manipulated by an occupant of the vehicle; and
   a controller that is adapted to drive the electric pump in response to input of a command signal from the washer switch to the controller, wherein the controller is adapted to drive the switching device to switch the switching device between the first connecting state and the second connecting state;
   when the controller receives the command signal from the washer switch in presence of input of a reverse mode signal, which is inputted to the controller and indicates a reverse drive mode of the vehicle, the controller drives the switching device to switch from the first connecting state to the second connecting state within a predetermined pre-drive period, which starts from an initial time point of receiving the command signal from the washer switch in the presence of the input of the reverse mode signal to the controller; and
   the controller drives the electric pump for a predetermined drive period after an end of the predetermined pre-drive period to feed the washer fluid to the camera washer nozzle.

2. The washer apparatus according to claim 1, wherein:
   when the controller receives the command signal from the washer switch in presence of input of a reverse mode signal, which is inputted to the controller and indicates a reverse drive mode of the vehicle, the controller drives the switching device to switch from the first connecting state to the second connecting state and drives the electric pump for a predetermined drive period to feed the washer fluid to the camera washer nozzle; and
   the controller drives the switching device to switch from the second connecting state to the first connecting state after an end of the predetermined drive period.

3. The washer apparatus according to claim 2, wherein the controller drives the switching device to switch from the second connecting site to the first connecting state after an end of a predetermined post-drive period, which starts from the end of the predetermined drive period.

4. The washer apparatus according to claim 3, wherein:
   the at least one window glass washer nozzle includes a rear window glass washer nozzle, which is placed at a rear side of the vehicle and is adapted to spray the washer fluid over the rear window glass of the vehicle; and
   the controller restarts the electric pump after the end of the predetermined post-drive period when the controller continuously receives the command signal of the washer switch since an initial time point of receiving the command signal of the washer switch in the presence of the input of the reverse mode signal to the controller even after the end of the predetermined post-drive period.

5. The washer apparatus according to claim 4, wherein the controller restarts the electric pump after an end of a predetermined pre-restart period, which starts from the end of the predetermined post-drive period.

6. The washer apparatus according to claim 4, further comprising a rear wiper and a rear wiper motor, wherein:
the rear wiper motor is adapted to drive the rear wiper to wipe the rear window glass; and
the controller drives the rear wiper motor synchronously with the restarting of the electric pump.

7. The washer apparatus according to claim 1, wherein the reverse mode signal is an electric signal, which indicates placement of a shift lever of a transmission of the vehicle in a reverse position.

8. The washer apparatus according to claim 1, further comprising a display that is adapted to display a captured image of the onboard camera, wherein:
the controller is adapted to display the captured image of the onboard camera and a camera wash touch panel switch on the display in response to input of a reverse mode signal, which indicates a reverse drive mode of the vehicle, to the controller;
the camera wash touch panel switch outputs a command signal when the camera wash touch panel switch is turned on by the occupant of the vehicle; and
the controller is adapted to drive the switching device to switch from the first connecting state to the second connecting state in response to input of one of the reverse mode signal and the command signal of the camera wash touch panel switch to the controller; and
the controller is adapted to drive the electric pump in response to input of the command signal from the camera wash touch panel switch to the controller.

9. The washer apparatus according to claim 1, wherein the controller is adapted to drive the switching device to switch the switching device between the first connecting state and the second connecting state in a state where the electric pump is stopped.

10. A washer apparatus for a vehicle, comprising:
a tank that is adapted to store washer fluid;
a camera washer nozzle that is adapted to receive the washer fluid from the tank and to spray the washer fluid over one side of an onboard camera of the vehicle where a lens of the onboard camera is located;
at least one window glass washer nozzle that is adapted to receive the washer fluid from the tank and to spray the washer fluid over at least one of a front window glass and a rear window glass of the vehicle;
an electric pump that is adapted to pump the washer fluid from the tank and thereby to supply the washer fluid toward the camera washer nozzle and the at least one window glass washer nozzle;
a main conduit that is adapted to connect between the electric pump and the at least one window glass washer nozzle to feed the washer fluid to the at least one window glass washer nozzle;
a branch conduit that is branched from the main conduit at a branch point and is adapted to connect between an upstream side portion of the main conduit, which is located on an upstream side of the branch conduit in a flow direction of the washer fluid, and the camera washer nozzle to feed the washer fluid to the camera washer nozzle;
a switching device that is provided at the branch point between the upstream side portion of the main conduit and the branch conduit and is adapted to switch between a first connecting state, in which the switching device connects the upstream side portion of the main conduit to the at least one window glass washer nozzle, and a second connecting state, in which the switching device connects the upstream side portion of the main conduit to the camera washer nozzle;
a washer switch that is adapted to be manipulated by an occupant of the vehicle; and
a controller that is adapted to drive the electric pump in response to input of a command signal from the washer switch to the controller, wherein:
the controller is adapted to drive the switching device to switch the switching device between the first connecting state and the second connecting state; and
the controller drives the electric pump to feed the washer fluid to the at least one window glass washer nozzle when the controller receives the command signal of the washer switch in absence of input of a reverse mode signal, which indicates a reverse drive mode of the vehicle, to the controller.

11. The washer apparatus according to claim 10, further comprising a rear wiper and a rear wiper motor, wherein:
the rear wiper motor is adapted to drive the rear wiper to wipe the rear window glass; and
the controller drives the rear wiper motor when the controller receives the command signal of the washer switch in absence of input of a reverse mode signal, which indicates a reverse drive mode of the vehicle, to the controller.

12. The washer apparatus according to claim 10, further comprising a display that is adapted to display a captured image of the onboard camera, wherein:
the controller is adapted to display the captured image of the onboard camera and a camera wash touch panel switch on the display in response to input of a reverse mode signal, which indicates a reverse drive mode of the vehicle, to the controller;
the camera wash touch panel switch outputs a command signal when the camera wash touch panel switch is turned on by the occupant of the vehicle; and
the controller is adapted to drive the switching device to switch from the first connecting state to the second connecting state in response to input of one of the reverse mode signal and the command signal of the camera wash touch panel switch to the controller; and
the controller is adapted to drive the electric pump in response to input of the command signal from the camera wash touch panel switch to the controller.

13. A washer apparatus for a vehicle, comprising:
a tank that is adapted to store washer fluid;
a camera washer nozzle that is adapted to receive the washer fluid from the tank and to spray the washer fluid over one side of an onboard camera of the vehicle where a lens of the onboard camera is located;
an electric pump that is adapted to pump the washer fluid from the tank and thereby to supply the washer fluid toward the camera washer nozzle;
a display that is adapted to display a captured image of the onboard camera; and
a controller that is adapted to display the captured image of the onboard camera and a camera wash touch panel switch on the display in response to input of a reverse mode signal, which indicates a reverse drive mode of the vehicle, to the controller, wherein the controller is adapted to drive the electric pump to feed the washer fluid to the camera washer nozzle in response to input of a command signal from the camera wash touch panel switch to the controller upon turning on of the camera wash touch panel switch by an occupant of the vehicle.

14. The washer apparatus according to claim 13, further comprising:
   at least one window glass washer nozzle that is adapted to receive the washer fluid from the tank and to spray the washer fluid over at least one of a front window glass and a rear window glass of the vehicle;
   a main conduit that is adapted to connect between the electric pump and the at least one window glass washer nozzle to feed the washer fluid to the at least one window glass washer nozzle;
   a branch conduit that is branched from the main conduit at a branch point and is adapted to connect between an upstream side portion of the main conduit, which is located on an upstream side of the branch conduit in a flow direction of the washer fluid, and the camera washer nozzle to feed the washer fluid to the camera washer nozzle; and
   a switching device that is provided at the branch point between the upstream side portion of the main conduit and the branch conduit and is adapted to switch between a first connecting state, in which the switching device connects the upstream side portion of the main conduit to the at least one window glass washer nozzle, and a second connecting state, in which the switching device connects the upstream side portion of the main conduit to the camera washer nozzle, wherein the controller drives the switching device to switch from the first connecting state to the second connecting state when the controller receives the command signal from the camera wash touch panel switch.

15. The washer apparatus according to claim 13, further comprising:
   at least one window glass washer nozzle that is adapted to receive the washer fluid from the tank and to spray the washer fluid over at least one of a front window glass and a rear window glass of the vehicle;
   a main conduit that is adapted to connect between the electric pump and the at least one window glass washer nozzle to feed the washer fluid to the at least one window glass washer nozzle;
   a branch conduit that is branched from the main conduit at a branch point and is adapted to connect between an upstream side portion of the main conduit, which is located on an upstream side of the branch conduit in a flow direction of the washer fluid, and the camera washer nozzle to feed the washer fluid to the camera washer nozzle; and
   a switching device that is provided at the branch point between the upstream side portion of the main conduit and the branch conduit and is adapted to switch between a first connecting state, in which the switching device connects the upstream side portion of the main conduit to the at least one window glass washer nozzle, and a second connecting state, in which the switching device connects the upstream side portion of the main conduit to the camera washer nozzle, wherein the controller drives the switching device to switch from the first connecting state to the second connecting state when the controller receives the reverse mode signal.

16. The washer apparatus according to claim 13, wherein the controller drives the electric pump for a predetermined drive period to feed the washer fluid to the camera washer nozzle when the controller receives the command signal from the camera wash touch panel switch.

17. The washer apparatus according to claim 13, wherein the controller drives the electric pump to feed the washer fluid to the camera washer nozzle through a period, through which the controller continuously receives the command signal from the camera wash touch panel switch.

* * * * *